(12) United States Patent
Feng et al.

(10) Patent No.: US 10,985,895 B2
(45) Date of Patent: Apr. 20, 2021

(54) ENHANCED UPLINK AND DOWNLINK POWER CONTROL FOR LTE TDD EIMTA

(71) Applicant: QUALCOMM Incorporated, San Diego, CA (US)

(72) Inventors: Minghai Feng, Beijing (CN); Jiming Guo, Beijing (CN); Neng Wang, Beijing (CN); Jilei Hou, Beijing (CN); Hao Xu, Beijing (CN); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 15/713,468

(22) Filed: Sep. 22, 2017

(65) Prior Publication Data
US 2018/0013539 A1 Jan. 11, 2018

Related U.S. Application Data

(62) Division of application No. 14/429,766, filed as application No. PCT/CN2012/082577 on Oct. 8, 2012, now Pat. No. 9,794,051.

(51) Int. Cl.
*H04L 5/14* (2006.01)
*H04W 52/14* (2009.01)
(Continued)

(52) U.S. Cl.
CPC ............. *H04L 5/14* (2013.01); *H04W 52/10* (2013.01); *H04W 52/146* (2013.01);
(Continued)

(58) Field of Classification Search
CPC ... H04W 52/243; H04W 52/38; H04W 52/40; H04W 72/0473; H04W 72/082; H04W 74/004
(Continued)

(56) References Cited

U.S. PATENT DOCUMENTS 8,248,976 B2    8/2012   Lim et al.
8,285,319 B2   10/2012   Shin et al.
(Continued)

FOREIGN PATENT DOCUMENTS

CN    102149099 A    8/2011
CN    102333377 A    1/2012
(Continued)

OTHER PUBLICATIONS

International Search Report and Written Opinion—PCT/CN2012/082577—ISA/EPO—dated Jul. 18, 2013.
(Continued)

*Primary Examiner* — Huy D Vu
*Assistant Examiner* — Nizam U Ahmed
(74) *Attorney, Agent, or Firm* — Arent Fox LLP

(57) ABSTRACT

A method, an apparatus, and a computer program product for wireless communication are provided. The apparatus determines an interference type between a time division duplex (TDD) configuration subframe of a serving cell and a corresponding TDD configuration subframe of a neighboring cell, and sets a transmit power for an apparatus in the serving cell based on the interference type. The apparatus in the serving cell may be a user equipment (UE), in which case the apparatus applies a set of uplink (UL) open loop power control parameters for the UE. The apparatus in the serving cell may be a base station (eNB), in which case a DL transmit power is set for the eNB. Depending on the interference type, the DL transmit power may be a fixed, full power DL transmission or an adjusted DL transmission.

4 Claims, 25 Drawing Sheets

(51) Int. Cl.
*H04W 52/10* (2009.01)
*H04W 52/24* (2009.01)
*H04W 72/04* (2009.01)
*H04W 74/00* (2009.01)
*H04W 52/40* (2009.01)
*H04W 52/08* (2009.01)
*H04W 52/22* (2009.01)
*H04W 52/38* (2009.01)
*H04W 72/08* (2009.01)

(52) U.S. Cl.
CPC ..... *H04W 52/243* (2013.01); *H04W 72/0473* (2013.01); *H04W 74/004* (2013.01); *H04W 52/08* (2013.01); *H04W 52/143* (2013.01); *H04W 52/223* (2013.01); *H04W 52/38* (2013.01); *H04W 52/40* (2013.01); *H04W 72/082* (2013.01)

(58) Field of Classification Search
USPC .......................................................... 370/280
See application file for complete search history.

(56) References Cited

U.S. PATENT DOCUMENTS

| | | |
|---|---|---|
| 2008/0101262 A1 | 5/2008 | Brunel et al. |
| 2010/0172272 A1* | 7/2010 | Tenny ................... H04W 24/00 370/280 |
| 2011/0038271 A1* | 2/2011 | Shin .................... H04W 52/146 370/252 |
| 2011/0111788 A1 | 5/2011 | Damnjanovic et al. |
| 2011/0235582 A1 | 9/2011 | Chen et al. |
| 2011/0306383 A1 | 12/2011 | Lee, II et al. |
| 2012/0106407 A1 | 5/2012 | Papasakellariou et al. |
| 2012/0213105 A1* | 8/2012 | Wigren ..................... G01S 5/10 370/252 |
| 2012/0252523 A1 | 10/2012 | Ji |
| 2012/0314600 A1 | 12/2012 | Zeira |
| 2013/0242814 A1* | 9/2013 | Wang ................... H04L 1/1635 370/280 |
| 2013/0329592 A1 | 12/2013 | Beale |
| 2014/0022961 A1 | 1/2014 | Park et al. |
| 2014/0126501 A1 | 5/2014 | Pan et al. |
| 2014/0133366 A1* | 5/2014 | Ribeiro ............... H04W 52/146 370/278 |
| 2014/0146719 A1 | 5/2014 | Gao et al. |
| 2015/0256320 A1 | 9/2015 | Feng et al. |

FOREIGN PATENT DOCUMENTS

| | | |
|---|---|---|
| EP | 2451223 A1 | 5/2012 |
| JP | 2008167412 A | 7/2008 |
| JP | 2013509007 A | 3/2013 |
| JP | 2014513462 A | 5/2014 |
| WO | 2011040647 A1 | 4/2011 |
| WO | 2011119973 A1 | 9/2011 |
| WO | 2012102569 A2 | 8/2012 |
| WO | 2012128558 A2 | 9/2012 |

OTHER PUBLICATIONS

Renesas Mobile Europe Ltd: "Further Considerations on Enhancement of ABS Resource Status", 3GPP Draft; R1-123577, 3rd Generation Partnership Project (3GPP), Mobile Competence Centre; 650, Route Des Lucioles; F-06921 Sophia-Antipolis Cedex; France, vol. RAN WG1, no. Qingdao, China; Aug. 13, 2012-Aug. 17, 2012, Aug. 5, 2012 (Aug. 5, 2012), XP050661455, pp. 3.

Supplementary European Search Report—EP12886421—Search Authority—The Hague—dated Apr. 1, 2016.

* cited by examiner

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| New timeline for 0 | - | - | 6 | 7 | 4 | - | - | 6 | 7 | 4 |
| 1 | - | - | 6 | 8 | 4 | - | - | 6 | 8 | 4 |
| 2 | - | - | 6 | 4 | - | - | - | 6 | 4 | - |
| 3 | - | - | 4 | 4 | 4 | - | - | 4 | - | - |
| 4 | - | - | 4 | 4 | - | - | - | - | - | - |
| 5 | - | - | 4 | - | - | - | - | - | - | - |
| 6 | - | - | 7 | 7 | 5 | - | - | 7 | 7 | - |

ENHANCED UPLINK AND DOWNLINK POWER CONTROL FOR LTE TDD EIMTA

CROSS-REFERENCE TO RELATED APPLICATION(S)

This application is a divisional of U.S. application Ser. No. 14/429,766, filed on Mar. 19, 2015 and entitled "ENHANCED UPLINK AND DOWNLINK POWER CONTROL FOR LTE TDD EIMTA", which is a national stage entry of PCT/CN2012/082577 filed on Oct. 8, 2012, each of which is expressly incorporated by reference herein in its entirety.

BACKGROUND

Field

The present disclosure relates generally to communication systems, and more particularly, to an enhanced uplink and downlink power control for LTE time division duplex (TDD) eIMTA.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. In one aspect, the apparatus determines an interference type between a time division duplex (TDD) configuration subframe of a serving cell and a corresponding TDD configuration subframe of a neighboring cell, and sets a transmit power for an apparatus in the serving cell based on the interference type. The apparatus in the serving cell may be a user equipment (UE), in which case the apparatus applies a set of uplink (UL) open loop power control parameters for the UE. The apparatus in the serving cell may be a base station (eNB), in which case a DL transmit power is set for the eNB. Depending on the interference type, the DL transmit power may be a fixed, full power DL transmission or an adjusted DL transmission.

In another aspect, the apparatus groups subframes of a TDD configuration of a serving cell into a set of anchor subframes and a set of non-anchor subframes, and calculates a respective UL transmit power for the set of anchor subframes and for the set of non-anchor subframes.

BRIEF DESCRIPTION OF THE DRAWINGS

FIG. 14 is a diagram illustrating a table of TDD configurations and their respective subframes.

DETAILED DESCRIPTION

Figure 1:
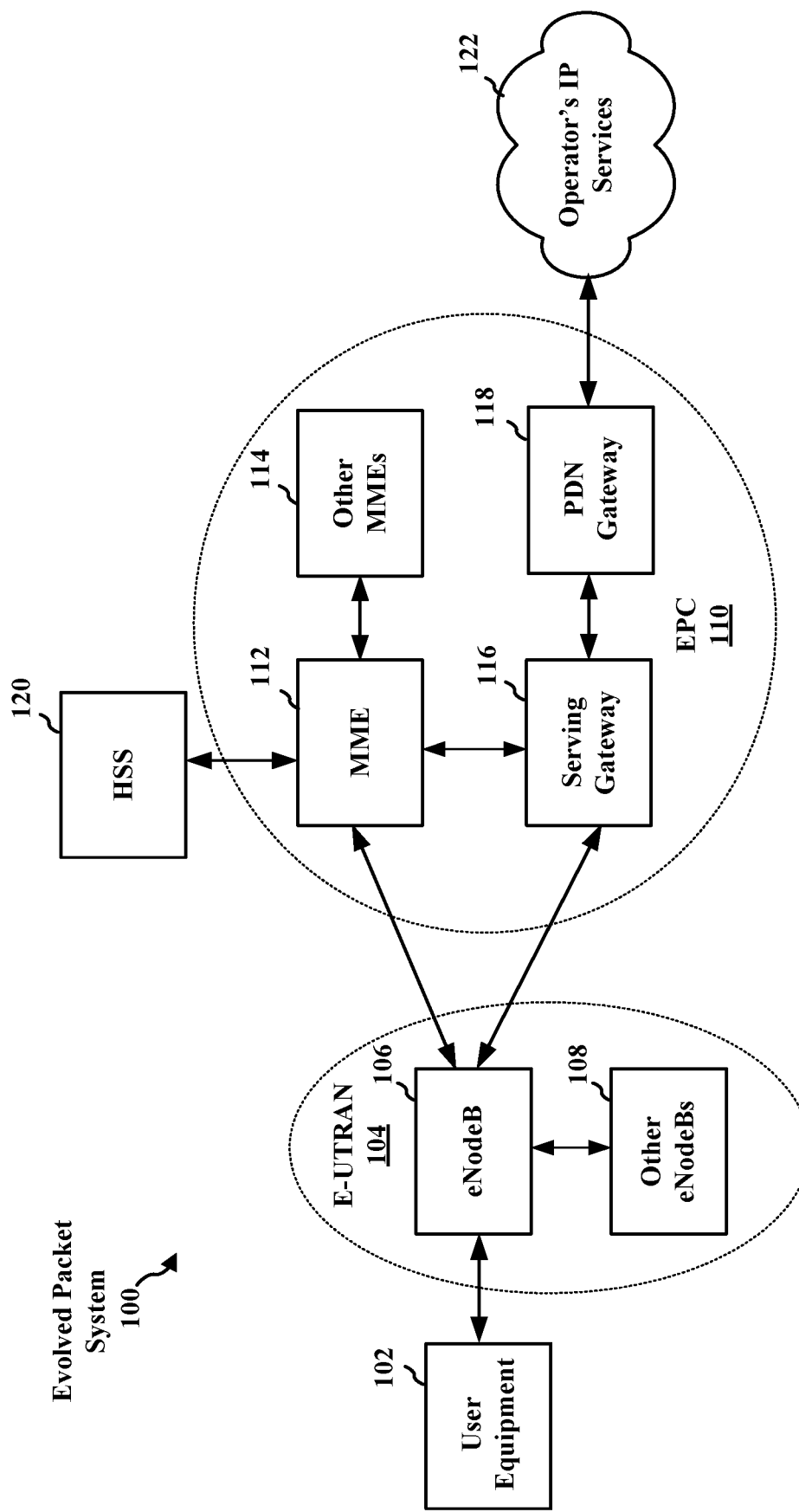
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMES 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
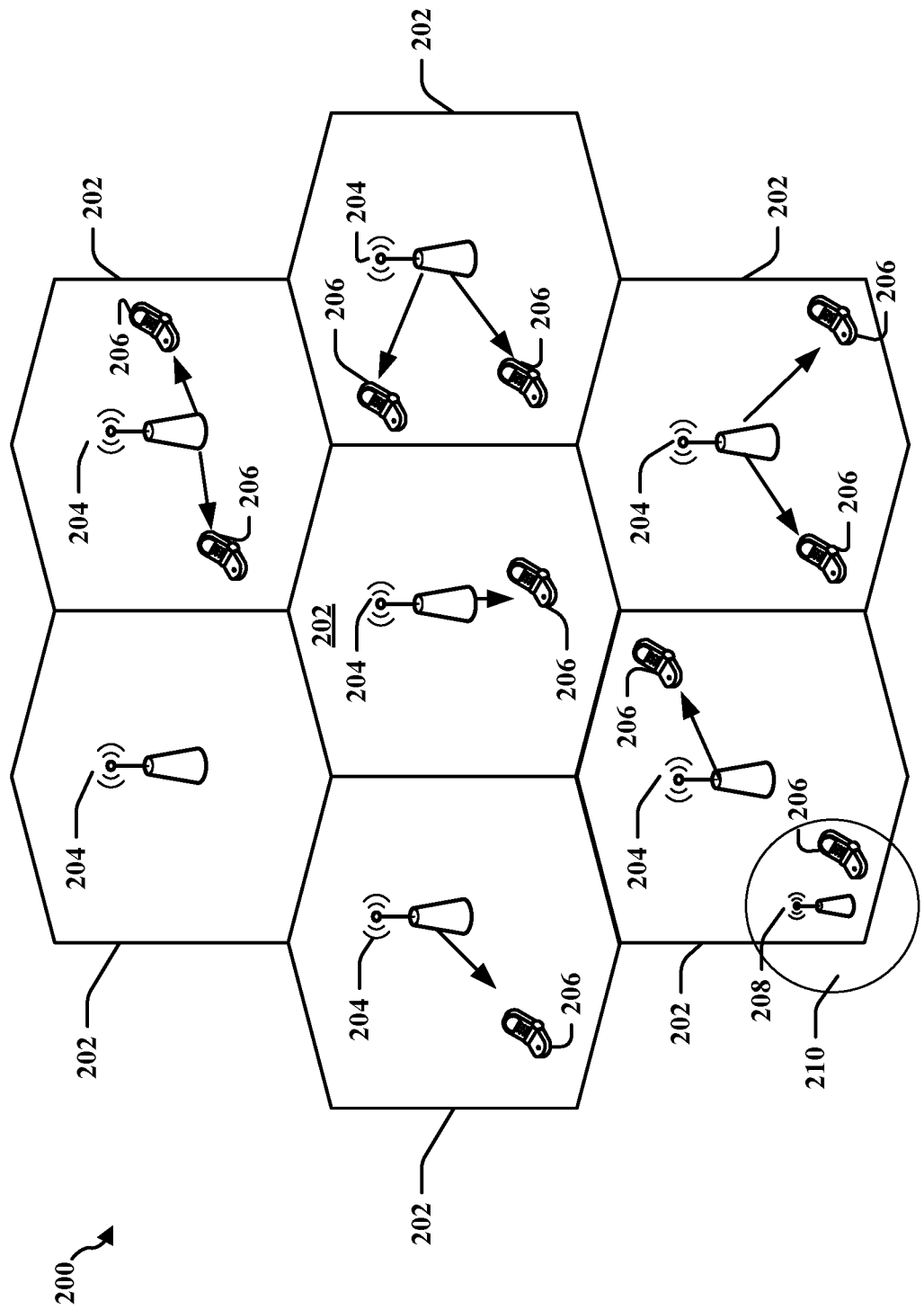
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
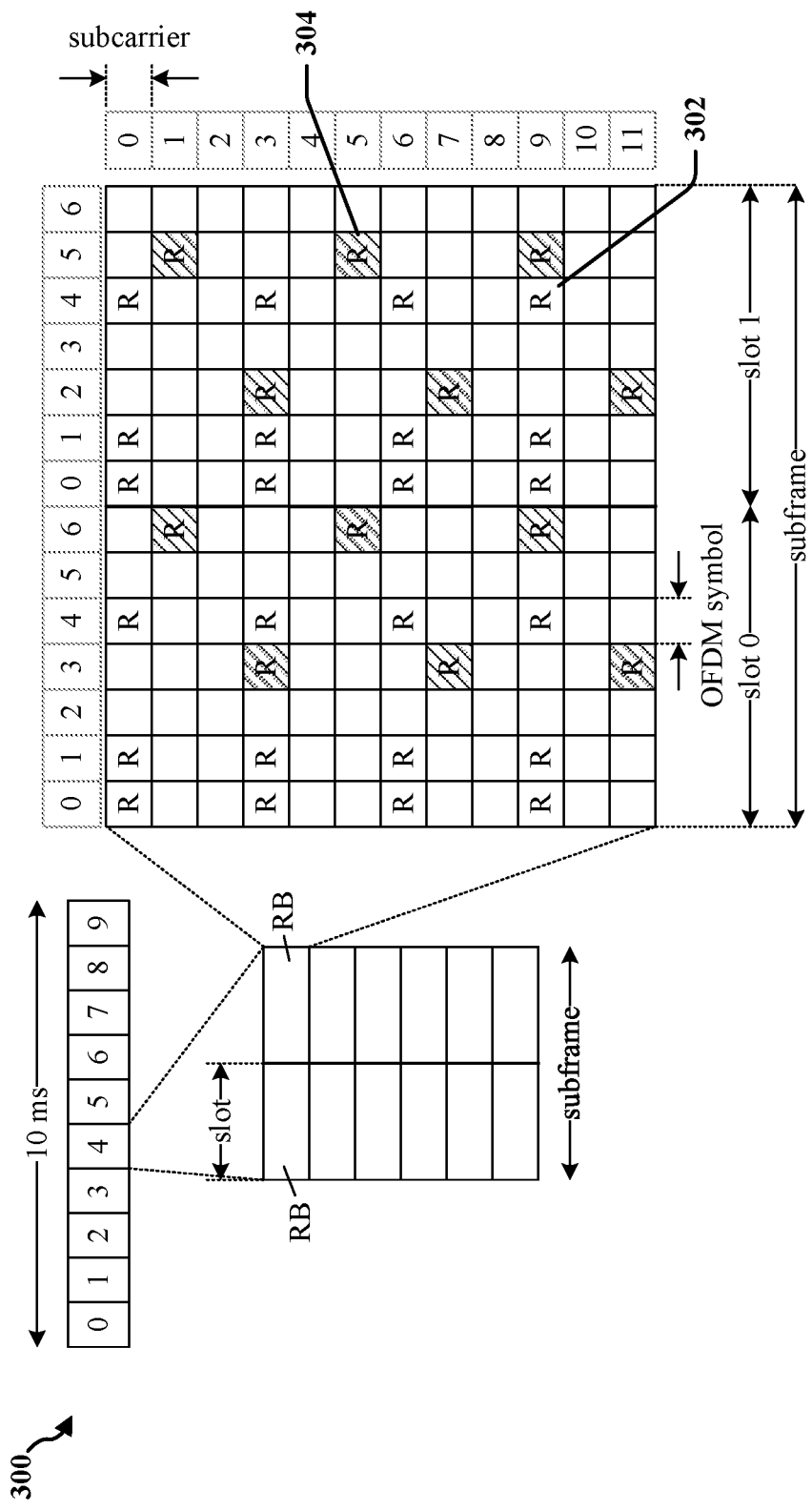
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
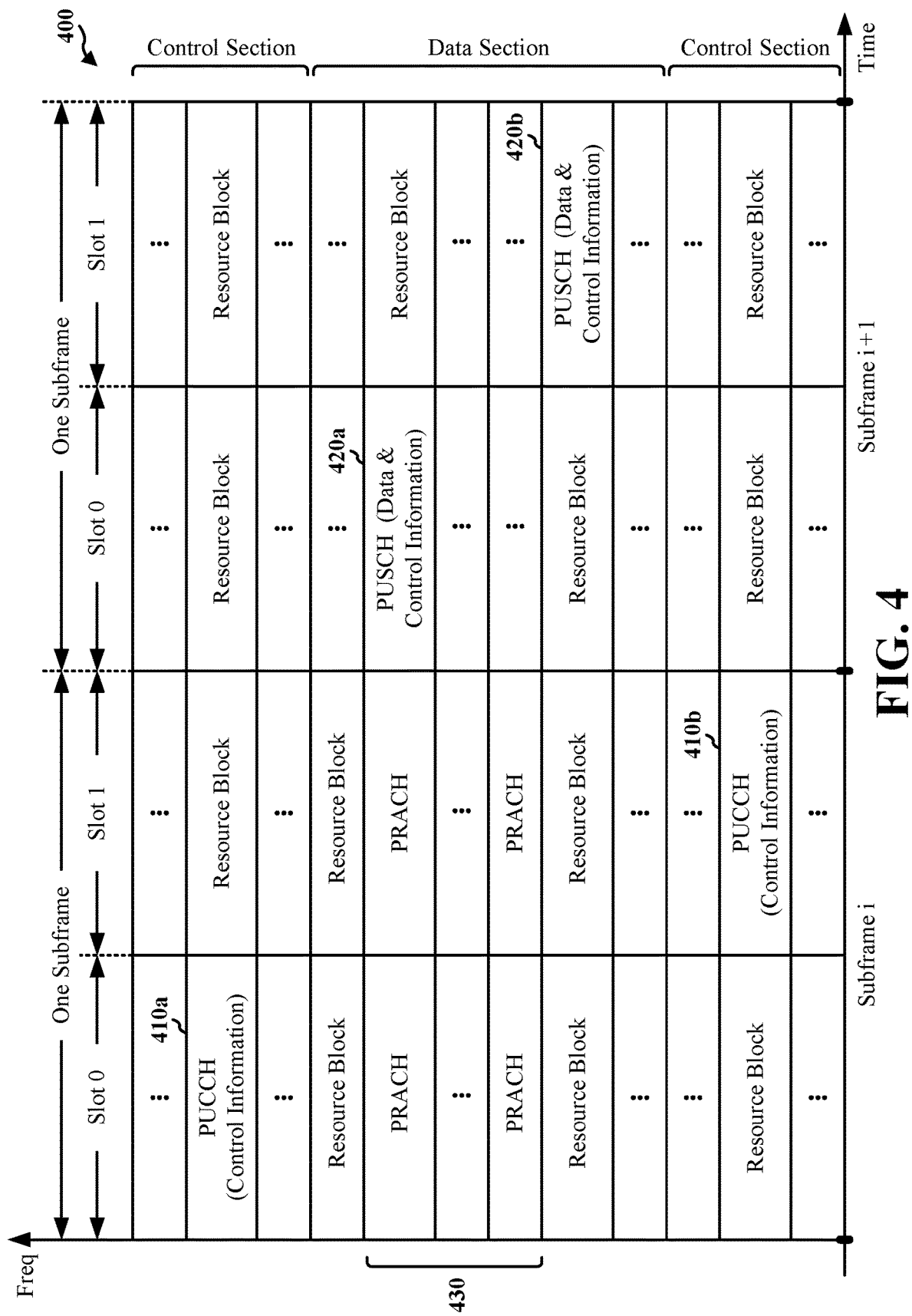
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
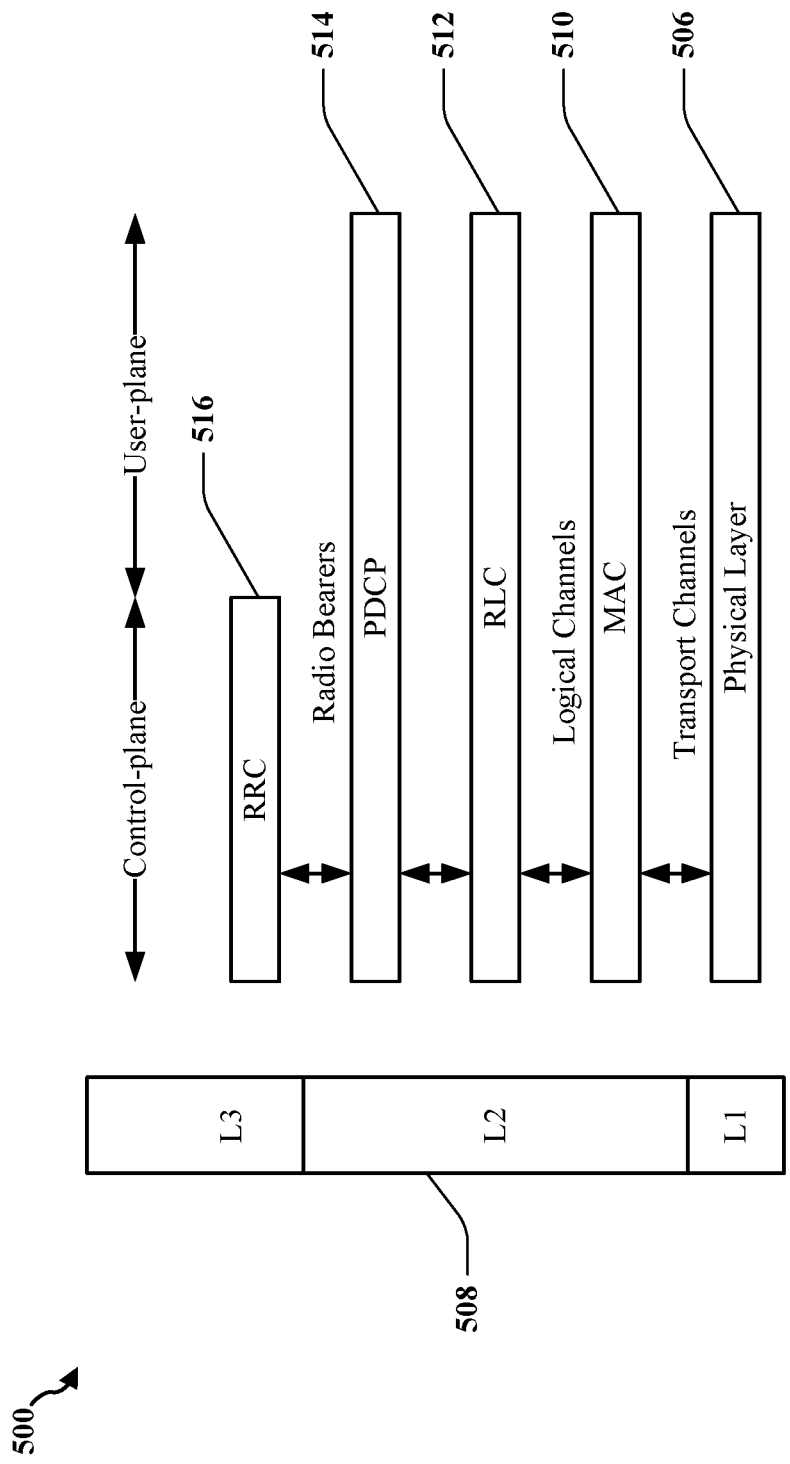
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARD). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
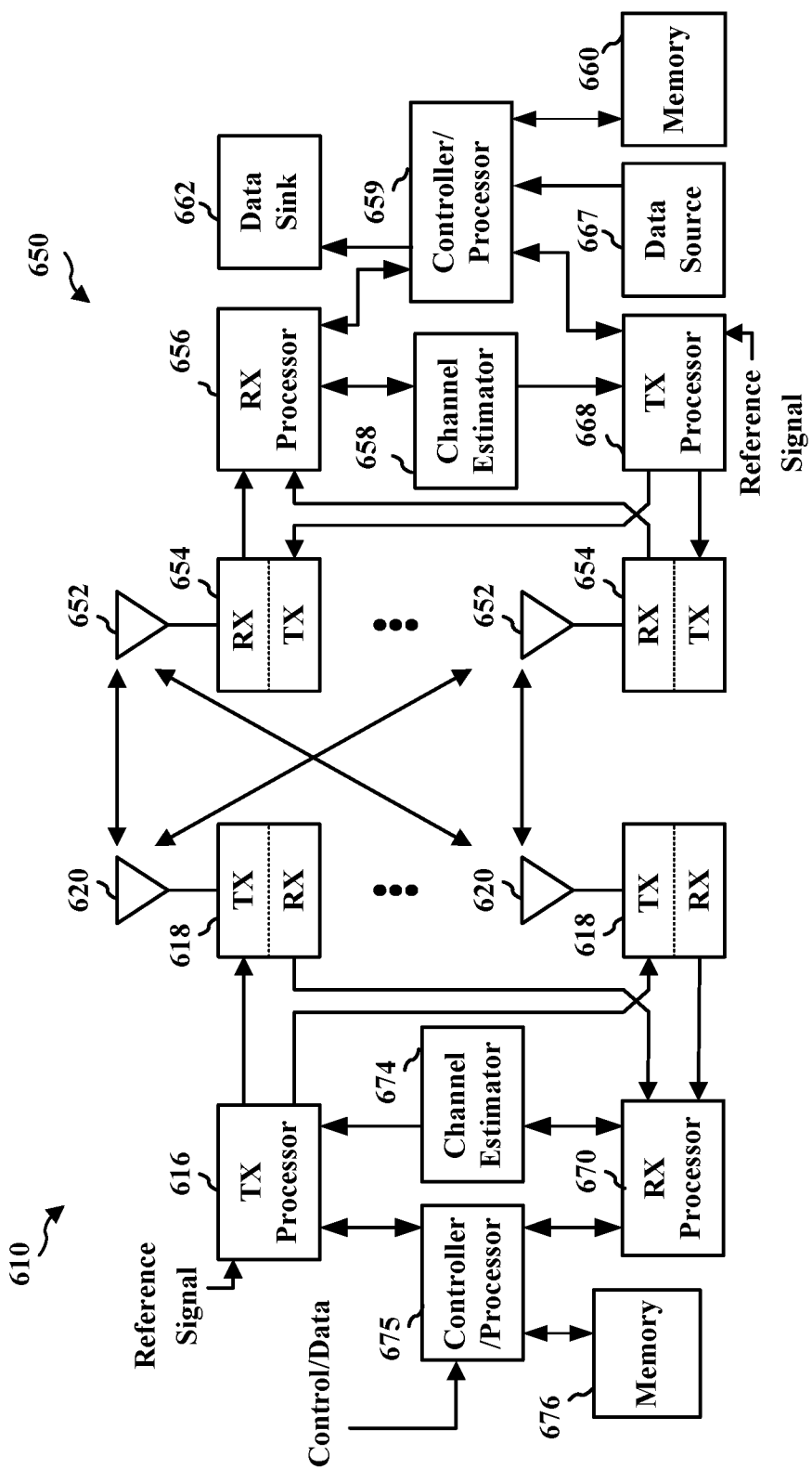
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In TDD LTE, eIMTA (enhanced Interference Management and Traffic Adaptation) the TDD configurations may have fixed subframes and flexible subframes. Fixed subframes are each designated exclusively as a downlink (DL or D) subframe, an uplink (UL or U) subframe or a special (S) subframe. Flexible subframes, also referred to herein as "dynamic" or "adaptive" subframes, may be designated as either an UL subframe or a DL subframe. Depending on their respective TDD configurations, a serving cell and a neighboring cell experience different levels and types of interference. Simulation results show there are both eNB-to-eNB interference and UE-to-UE interference when corresponding subframes of a serving cell and a neighboring cell are different link-type subframes, with the eNB-to-eNB interference being at a higher level. For example, eNB-to-eNB interference is high when the subframe of the serving cell is an UL subframe and the corresponding subframe of the neighboring cell is a DL subframe. This scenario is referred to as a "UL-DL coexistence" scenario.

Performance of a serving cell subjected to one or both of eNB-to-eNB interference and UE-to-UE interference may be improved through UL power control and DL power control, wherein the power control may be one of an open loop power control type or a closed loop power control type. In either case, with respect to UL power control, performance may be improved by boosting the UL transmit power to improve PUSCH/PUCCH performance in the impacted (i.e., interfered with) UL subframe, wherein the impacted UL subframe corresponds to a serving-cell UL subframe that coexists with a neighboring-cell DL subframe. With respect to DL power control, performance may be improved by decreasing the DL transmit power in the neighboring cell to minimize the interference on the impacted UL subframe.

Figure 7:
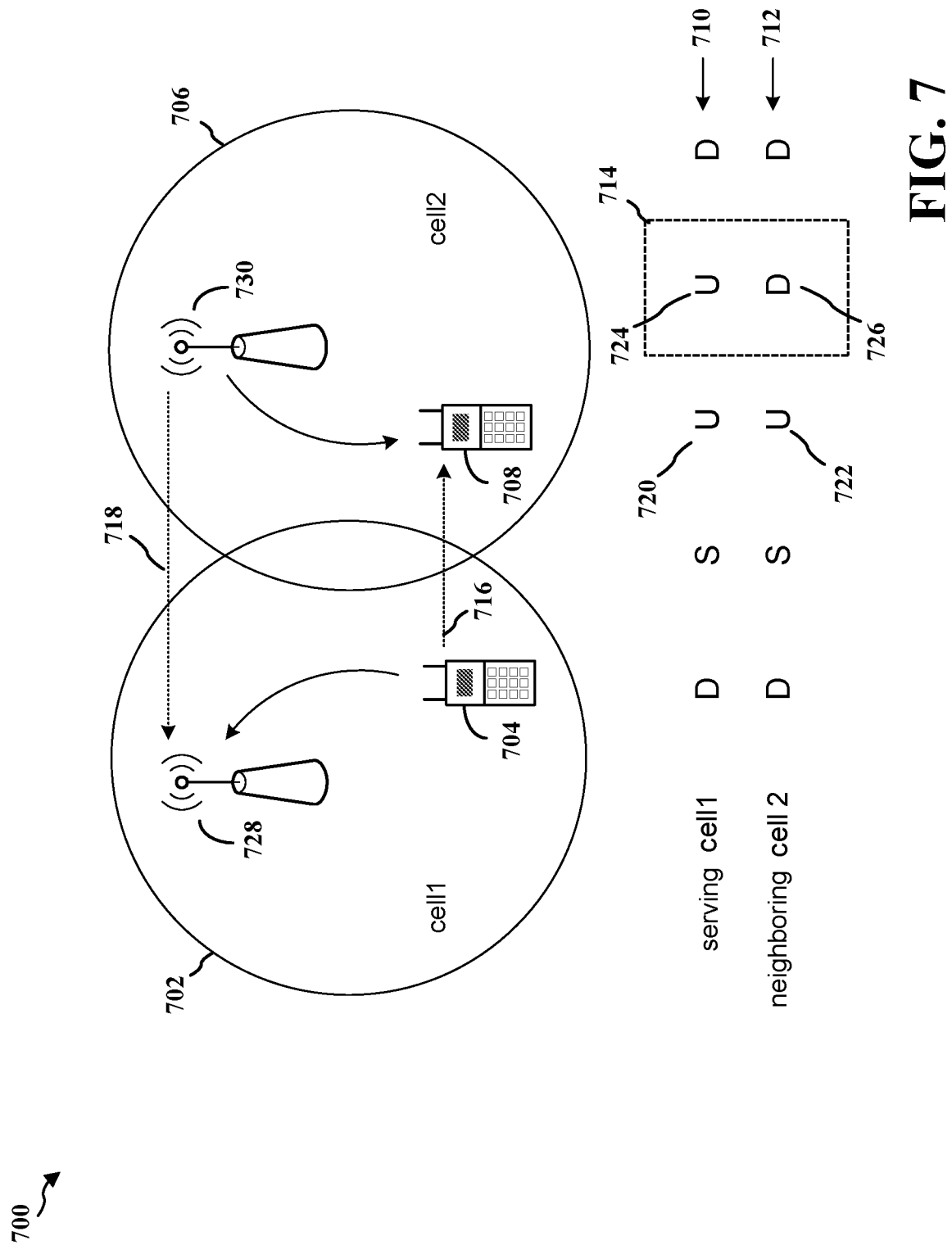
FIG. 7 is a diagram illustrating a UL-DL coexistence scenario, in which a first cell serving a first UE coexists with a second cell serving a second UE.

Uplink Open Loop Power Control:

FIG. 7 illustrates a UL-DL coexistence scenario 700, in which a first cell 702 serving a first UE 704 coexists with a second cell 706 serving a second UE 708. In this scenario the first cell 702 is a serving cell and the second cell 706 is a neighboring cell. The TDD configuration 710 of the first cell 702 is configuration 1 and the TDD configuration 712 of the second cell 706 is configuration 2. The corresponding subframes of the TDD configurations are the same or common in subframes 0, 1, 3 and 5. In the fourth subframe 714, however, the serving cell 702 is an UL subframe while the neighboring cell 706 is a DL subframe. In this case the fourth subframe 714 is a UL-DL coexistence subframe. During this subframe, UE-UE interference 716 to the neighboring cell and eNB-eNB interference 718 to the serving cell is present. As previously mentioned, the UE-UE interference 716 is typically low while the eNB-eNB interference 718 is typically high.

Under conventional open loop power control the UL transmit power in the serving cell 702 may be conservatively set toward the low side. However, because the UE-UE interference 716 to the neighboring cell is generally quite low, a more aggressive, i.e., higher, UL transmit power in the serving cell is possible. Also, an aggressive UL TX power setting in the serving cell is desirable due to high eNB-eNB interference 718 from the neighboring cell 706.

Uplink fractional open loop power control is specified in LTE from Rel. 8 as follows:

$$P_{PUSCH}(i) = \min\{P_{CMAX}, 10 \log_{10}(M_{PUSCH}(i)) + P_{O\_PUSCH}(j) + \alpha(j) \cdot PL\}$$

where:

$P_{O\_PUSCH}$ consists of a cell specific component $P_{O\_nominal\_PUSCH}$ and a UE specific component $P_{O\_UE\_PUSCH}$, α is a 3-bit cell specific parameter provided by higher layers, $M_{PUSCH}$ is the number of resource blocks on which the mobile is transmitting in subframe i, and PL is the downlink path loss.

Several approaches are presented for boosting the UL transmit power of the UE in the serving cell during UL-DL coexistence. These approaches, and the resulting power increase, improve performance of the physical UL control channel (PUCCH) and the physical UL shared channel (PUSCH) in the impacted UL subframe. In each of these approaches, different open loop power control parameters are used respectively for a UL-UL interference case and a UL-DL interference case.

In a first approach, two sets of ($P_O$, α) are defined, each having a different $P_O$ parameter corresponding to the coexistence condition of the particular subframe. One set is ($P_{O\_nominal\_PUSCH} + P_{O\_UE\_PUSCH\_UL-UL}$, α); the other set is ($P_{O\_nominal\_PUSCH} + P_{O\_UE\_PUSCH\_UL-DL}$, α). Under this approach, if the UE 704 in the serving cell 702 is on an UL subframe 720, and its neighboring cell 706 is also on an UL subframe 722, then the open loop power control parameters ($P_{O\_nominal\_PUSCH} + P_{O\_UE\_PUSCH\_UL-UL}$, α) are used for UL transmission by the UE 704. If the UE 704 is on UL subframe 724 and its neighboring cell 706 is on a DL subframe 726, then the open loop power control parameters ($P_{O\_nominal\_PUSCH} + P_{O\_UE\_PUSCH\_UL-DL}$, $\alpha$) are used for UL transmission by the UE 704.

In a second approach, two sets of ($P_O$, $\alpha$) are defined, each having a different a parameter corresponding to the coexistence condition of the particular subframe. One set is ($P_O$, $\alpha\_{UL-UL}$); the other set is ($P_O$, $\alpha\_{UL-DL}$). Under this approach, if the UE 704 of the serving cell 702 is on an UL subframe 720, and its neighboring cell 706 is also on an UL subframe 722, then the open loop power control parameters ($P_O$, $\alpha\_{UL-UL}$) are used for UL transmission by the UE 704. If the UE 704 is on an UL subframe 724 and its neighboring cell 706 is on a DL subframe 726, then the open loop power control parameters ($P_O$, $\alpha\_{UL-DL}$) are used for UL transmission by the UE 704.

In a third approach, two sets of ($P_O$, $\alpha$) are defined, each having a different $P_O$ parameter and a different a parameter corresponding to the coexistence condition of the particular subframe. Under this approach, if the UE 704 in the serving cell 702 is on an UL subframe 720, and its neighboring cell 706 is also on an UL subframe 722, then the open loop power control parameters ($P_{O\_nominal\_PUSCH} + P_{O\_UE\_PUSCH\_UL-UL}$, $\alpha\_{UL-UL}$) are used for UL transmission by the UE 704. If the UE 704 is on an UL subframe 724 and its neighboring cell 706 is on a DL subframe 726, then the open loop power control parameters ($P_{O\_nominal\_PUSCH} + P_{O\_UE\_PUSCH\_UL-DL}$, $\alpha\_{UL-DL}$) are for UL transmission by the UE 704.

In each of the three approaches, the ID of the neighboring cell 706 may be determined by selecting the highest RSRP from the UE's RSRP measurements of the neighboring cells. The TDD configuration of the neighboring cell 706 may be obtained through an X2 interface message between a base station 728 of the serving cell 702 and a base station 730 of the neighboring cell 706.

Figure 8:
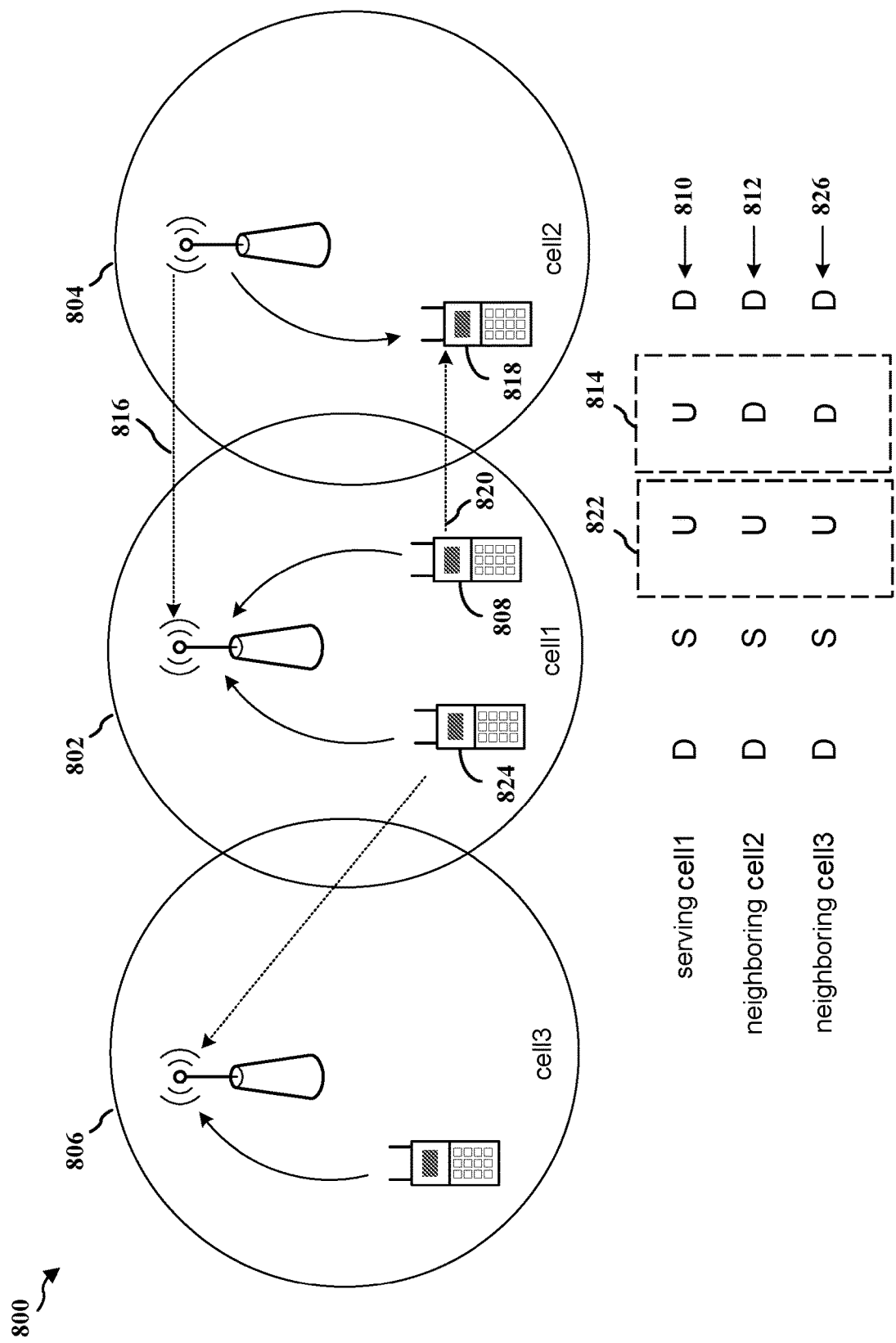
FIG. 8 is a diagram illustrating various subframe coexistence conditions among TDD subframes in a number of cells.

FIG. 8 illustrates various subframe coexistence conditions 800 among TDD subframes in a number of cells 802, 804, 806. In one coexistence condition, a first UE 808 within a first cell 802 is close to a second cell 804. The first cell 802 has a first TDD configuration 810 while the second cell 804 has a second TDD configuration 812. During the third subframe 814 of the first cell TDD configuration 810 and the second cell TDD configuration 812, the first cell 802 is in an UL direction while the second cell 804 is in a DL direction. In this UL-DL coexistence configuration, the first cell 802 is subjected to eNB-eNB interference 816 while a UE 818 within the second cell 804 is subjected to UE-UE interference 820. Under this condition, the parameters ($P_O$, $\alpha$) selected for UL transmission by the first UE 808 in the third subframe are ($P_{O\_nominal\_PUSCH} + P_{O\_UE\_PUSCH\_UL-DL}$, $\alpha$).

During the second subframe 822 of the first cell TDD configuration 810 and the second cell TDD configuration 812, the first cell 802 is in an UL direction and the second cell 808 is in an UL direction. In this UL-UL coexistence configuration, the parameters ($P_O$, $\alpha$) selected for UL transmission by the first UE 808 in the second subframe are ($P_{O\_nominal\_PUSCH} + P_{O\_UE\_PUSCH\_UL-UL}$, $\alpha$).

In a second coexistence condition, a second UE 824 within the first cell 802 is close to a third cell 806. The first cell 802 has a first TDD configuration 810 while the third cell 806 that has a third TDD configuration 826. During the third subframe 814 of the first cell TDD configuration 810 and the third cell TDD configuration 826, the first cell 802 is in an UL direction while the third cell 806 is in a DL direction. In this UL-DL coexistence configuration, the parameters ($P_O$, $\alpha$) selected for UL transmission by the second UE 824 in the third subframe are ($P_{O\_nominal\_PUSCH} + P_{O\_UE\_PUSCH\_UL-DL}$, $\alpha$).

During the second subframe 822 of the first cell TDD configuration 810 and the third cell TDD configuration 826, the first cell 802 is in an UL direction and the third cell 806 is in an UL direction. In this UL-UL coexistence configuration, the parameters ($P_O$, $\alpha$) selected for UL transmission by the second UE 824 in the second subframe are ($P_{O\_nominal\_PUSCH} + P_{O\_UE\_PUSCH\_UL-UL}$, $\alpha$).

Downlink Open Loop Power Control:

As mentioned above, performance of a serving cell subjected to one or both of eNB-to-eNB interference and UE-to-UE interference may be improved through DL power control by decreasing the DL transmit power in the neighboring cell to minimize the interference on the impacted UL subframe in the serving cell. In one approach to DL power control, the eNB in the neighboring that is to transmit based on such DL power control is treated as a UE and the open loop power control parameters ($P_O$, $\alpha$) of a UE in the neighboring cell are applied to that eNB so that interference to the eNB in the serving cell may be controlled. In the case of UL-DL coexistence, the open loop power control parameters ($P_O$, $\alpha$) are used for eNB DL power control. In the case of DL-DL coexistence a normal fixed DL power is used for eNB DL power control.

Figure 9:
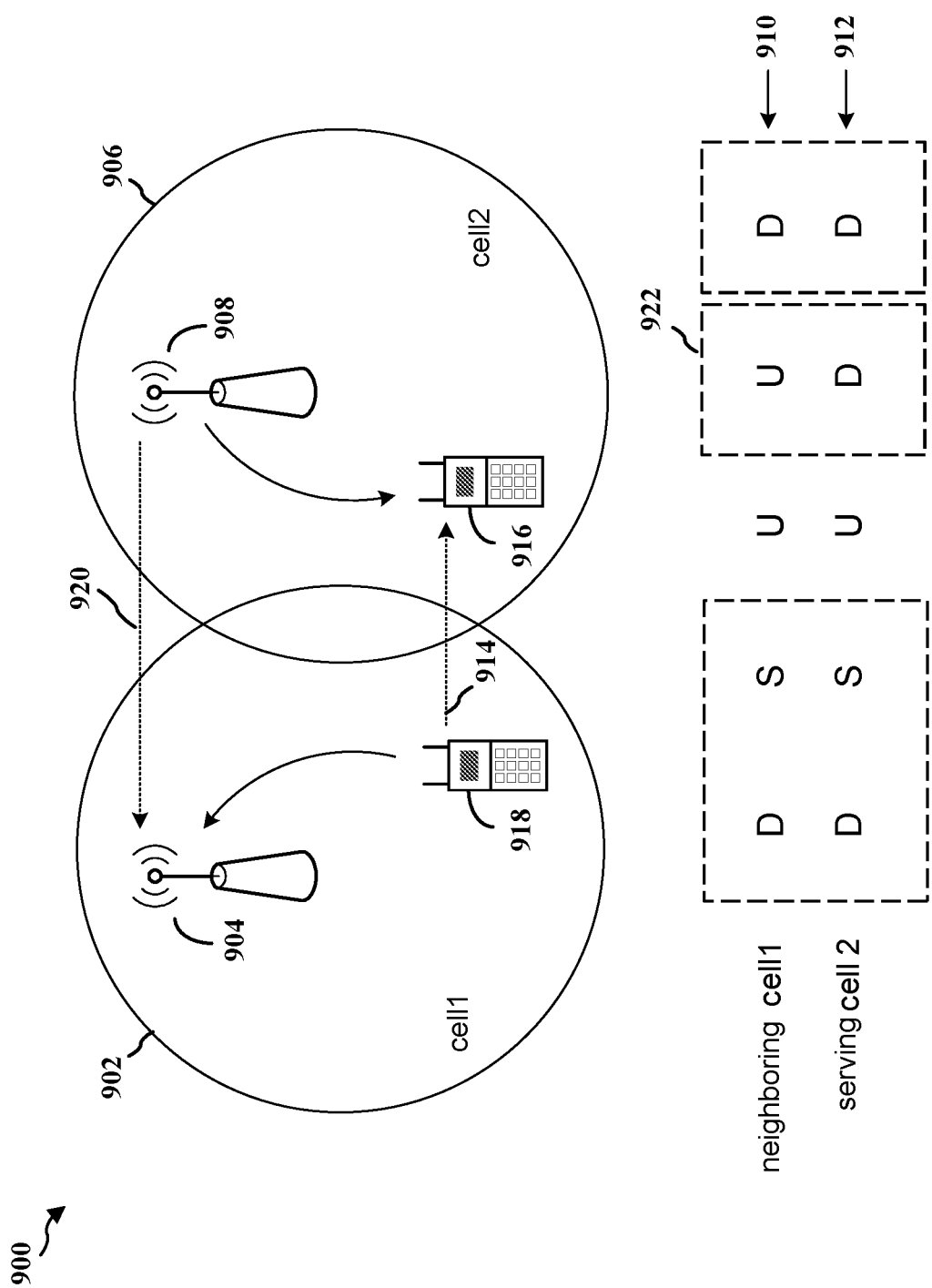
FIG. 9 is a diagram illustrating various coexistence scenarios among a first cell having a first eNB and a second cell having a second eNB.

FIG. 9 illustrates various coexistence scenarios 900 among a first cell 902 having a first eNB 904 and a first UE 918 and a second cell 906 having a second eNB 908 and a second UE 916. In these scenarios the first cell 902 is a neighboring cell and the second cell 906 is a serving cell. The TDD configuration 910 of the first cell 902 is configuration 1 and the TDD configuration 912 of the second cell 906 is configuration 2. The corresponding subframes of the TDD configurations are the same or common in subframes 0, 1, 2 and 4. For those common subframes that are either both DL subframes or special subframes, fixed, full power DL transmit power is used by the eNB 908 of the serving cell 906 in the corresponding subframe. In the case illustrated in FIG. 9, subframes 0 and 4 are common DL subframes, while subframe 1 is a common special subframe. Fixed, full DL transmit power will be used by the eNB 908 in the serving cell 906 during each of these subframes.

In the third subframe 922, the neighboring cell 902 is a UL subframe while the serving cell 906 is an DL subframe. In this case, the third subframe 922 is a DL-UL coexistence subframe. During the third subframe, UE-to-UE interference 914 from the UE 918 in the neighboring cell 902 to the UE 916 in the serving cell 906 is present. Likewise, eNB-to-eNB interference 920 from the eNB 908 in the serving cell 906 to the eNB 904 in the neighboring cell 902 is present. In the case of a DL-UL coexistence subframe, the DL transmit power of the eNB 908 in the serving cell 906 is set based on the UL open loop power control parameters ($P_O$, $\alpha$) of the neighboring cell 902 on the subframe. For example, in accordance with the open loop power control described above with respect to UL power control, in the case of DL-UL coexistence, the power control parameters ($P_O$, $\alpha$) may be ($P_{O\_nominal\_PUSCH} + P_{O\_UE\_PUSCH\_UL-DL}$, $\alpha$). The DL transmit power of the eNB 908 of the serving cell 906 in the third subframe would be set in accordance with these parameters and would essentially be equal to the UL transmit power used by the UE 918 in the neighboring cell 902 on the same subframe.

As in the UL power control describe above, the TDD configuration of the neighboring cell 902 may be obtained through an X2 interface message between a base station 904 of the neighboring cell 902 and a base station 908 of the serving cell 906.

Figure 10:
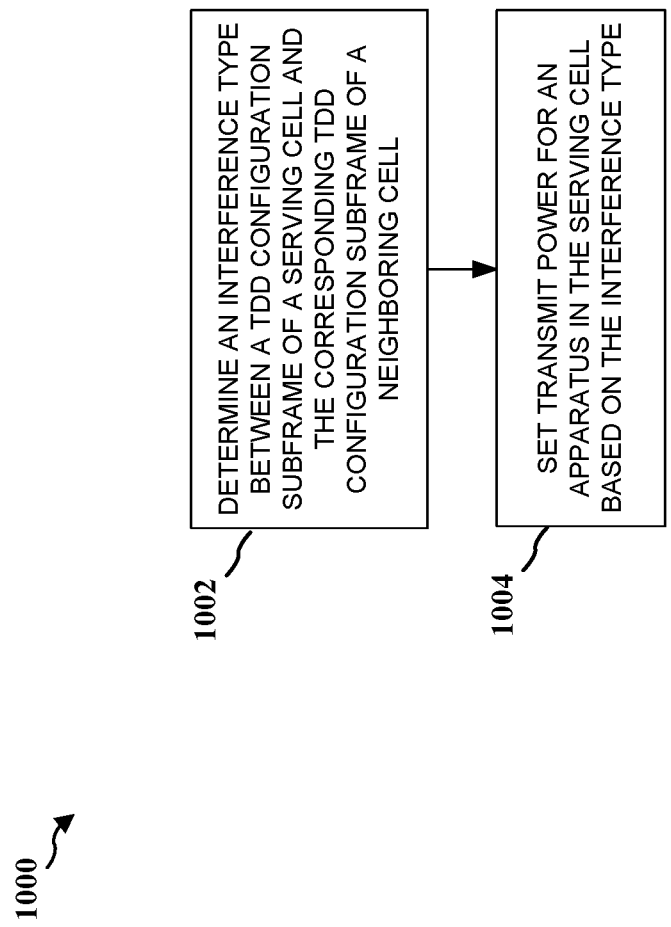
FIG. 10 is a flow chart of a method of open loop power control for wireless communication for an apparatus operating within a serving cell.

FIG. 10 is a flow chart 1000 of a method of open loop power control for wireless communication. The method may be performed by an apparatus, e.g. a UE or an eNB. At step 1002, an interference type between a TDD configuration subframe of a serving cell and a corresponding TDD configuration subframe of a neighboring cell is determined. At step 1004, transmit power for an apparatus in the serving cell is set based on the interference type.

Figure 11:
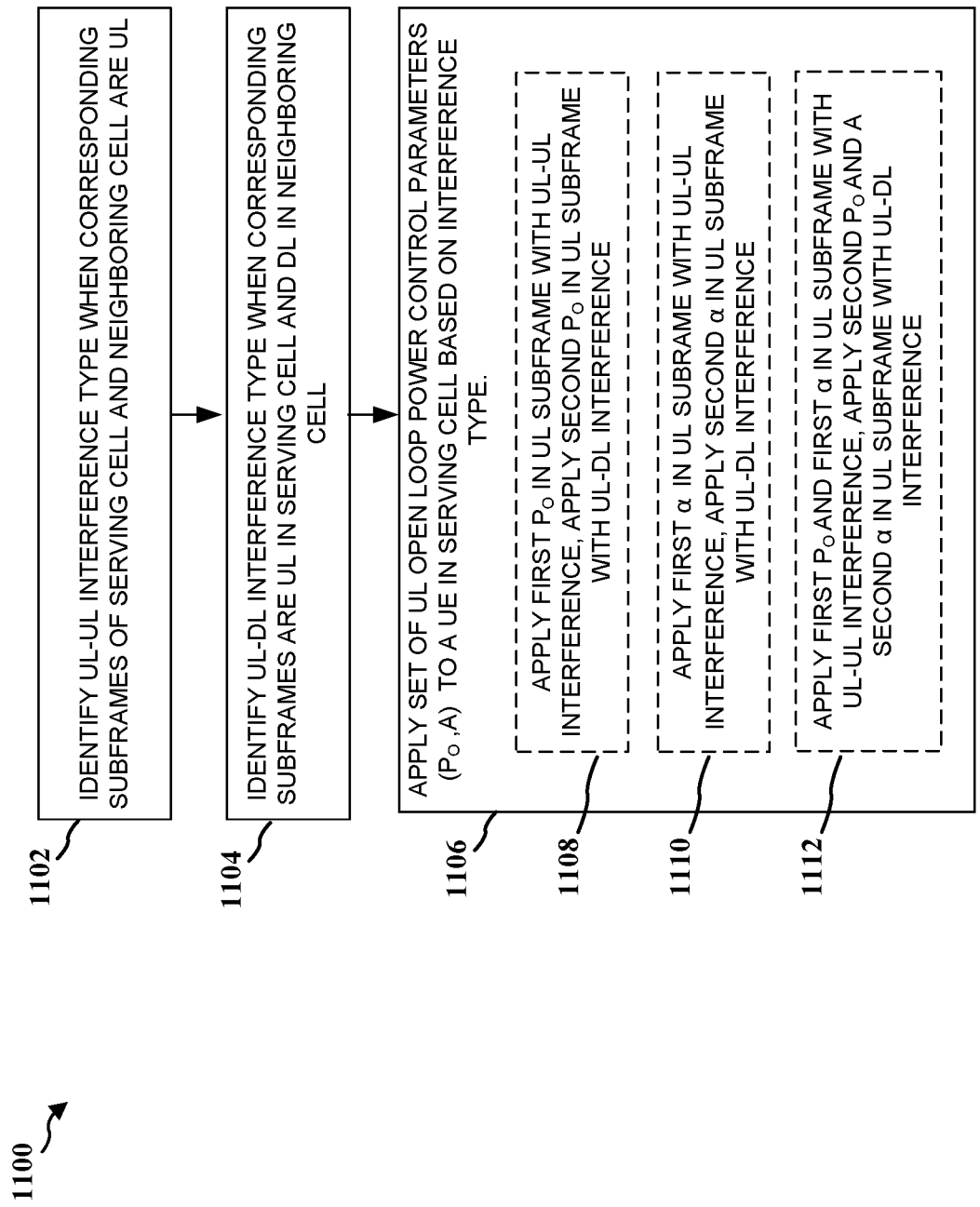
FIG. 11 is a flow chart of a method of UL open loop power control for wireless communication based on the flow chart of FIG. 10, where the apparatus is a UE.

FIG. 11 is a flow chart 1100 of a method of UL open loop power control for wireless communication based on the flow chart of FIG. 10, in the case where the apparatus in the serving cell is a UE and the transmit power corresponds to an UL open loop power control. The method may be performed by a UE.

At step 1102, a UL-UL interference type is identified when corresponding subframes of a serving cell and a neighboring cell are UL subframes. This type of identification corresponds to, for example, subframe 2 of FIG. 7.

At step 1104, a UL-DL interference type is identified when corresponding subframes of the serving cell and the neighboring cell comprise an UL subframe in the serving cell and a DL subframe in the neighboring cell. This type of identification corresponds to, for example, subframe 3 of FIG. 7.

At step 1106, a set of UL open loop power control parameters is applied to a UE in the serving cell based on the interference type. The set of UL open loop control parameters may be a UE specific component $P_O$ and a cell specific parameter $\alpha$, as included in the open loop power control equation described above.

One of several parameter applications may occur. For example, at step 1108, a first $P_O$ is applied in the UL subframe with UL-UL interference type and a second $P_O$ is applied in the UL subframe with UL-DL interference type. Alternatively, at step 1110, a first $\alpha$ is applied in the UL subframe with UL-UL interference type and a second $\alpha$ is applied in the UL subframe with UL-DL interference type. Alternatively, at step 1112, both of a first $P_O$ and a first $\alpha$ are applied in the UL subframe with UL-UL interference type, while both of a second $P_O$ and a second $\alpha$ are applied in the UL subframe with UL-DL interference type.

Figure 12:
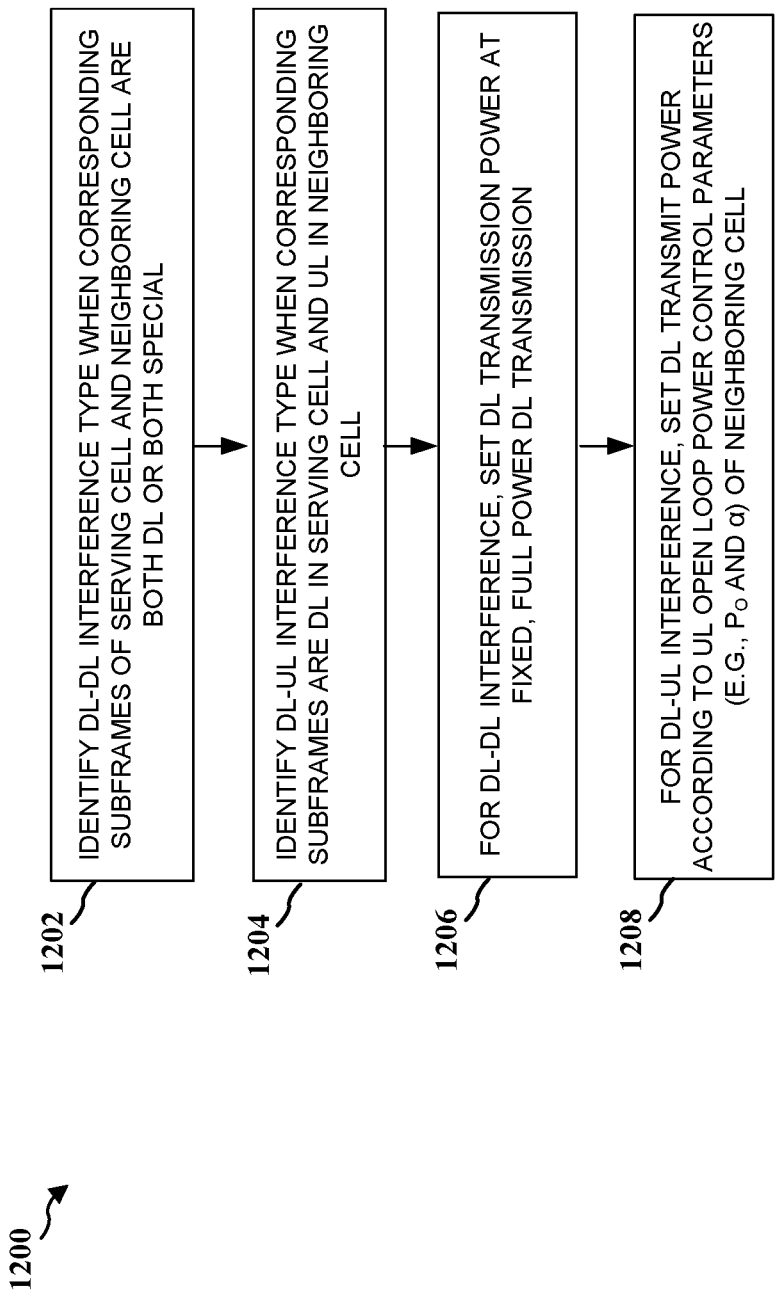
FIG. 12 is a flow chart of a method of DL open loop or DL fixed power control for wireless communication based on the method of FIG. 10, where the apparatus is a eNB.

FIG. 12 is a flow chart 1200 of a method of DL power control for wireless communication based on the method of FIG. 10, in the case where the apparatus in the serving cell is a eNB and the transmit power corresponds to a DL transmit power for use by the eNB. This method may be performed by the eNB.

At step 1202, a DL-DL interference type is identified when corresponding subframes of the serving cell and the neighboring cell are both downlink subframes or both special subframes. This type of identification corresponds to, for example, subframes 0, 1, and 4 of FIG. 9.

At step 1204, a DL-UL interference type is identified when corresponding subframes of the serving cell and the neighboring cell include a DL subframe in the serving cell and an UL subframe in the neighboring cell. This type of identification corresponds to, for example, subframe 3 of FIG. 9.

At step 1206, if the interference type is a DL-DL interference, then the DL transmit power is set at a fixed, full power DL transmission. Alternatively, at step 1208, if the interference type is a DL-UL interference, then the DL transmit power is set according to open loop power control parameters (e.g., $P_O$ and $\alpha$) of the neighboring cell.

Uplink Closed Loop Power Control:

As mentioned above, performance of a serving cell subjected to one or both of eNB-to-eNB interference and UE-to-UE interference may be improved through UL power control by boosting the UL transmit power. With respect to UL closed loop power control, a power boost is provided by using different power control loops for different sets of TDD configuration subframes. These sets of subframes are formed based on coexistence conditions of corresponding subframes of a serving cell and a neighboring cell.

Corresponding subframes that have a UL in the serving cell subframe and a UL in the neighboring cell subframe (referred to herein as "non-UL/DL coexistence" subframes) are designated as anchor subframes. Corresponding subframes that have a UL in the serving cell subframe and a DL in the neighboring cell subframe (referred to herein as "UL/DL coexistence" subframes) are designated as non-anchor subframes.

Figure 13:
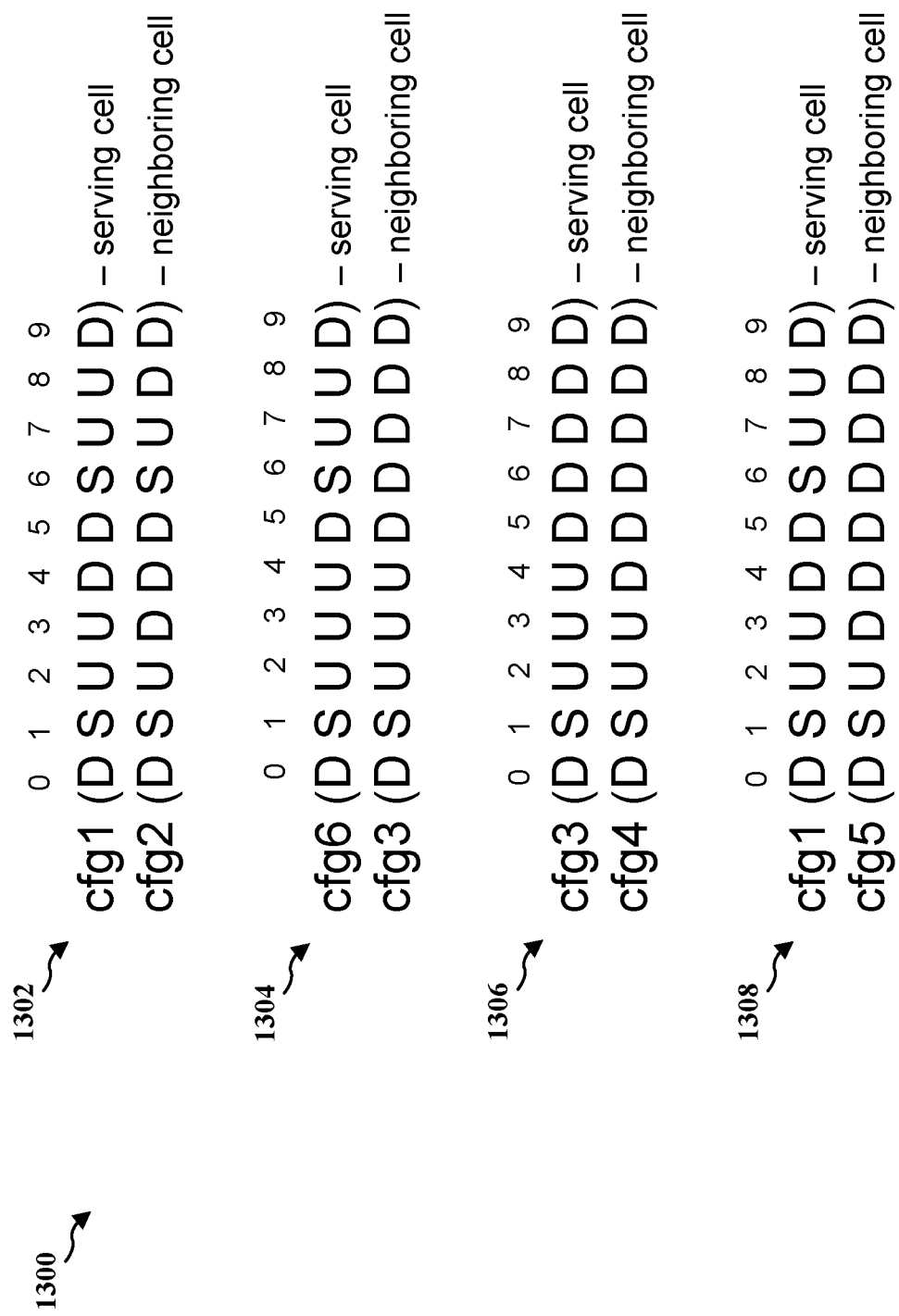
FIG. 13 is a diagram illustrating several examples of different coexisting serving cells and neighboring cells having respective TDD configurations.

FIG. 13 illustrates several examples 1300 of different coexisting serving cells and neighboring cells having respective TDD configurations. In the case 1302 where a serving cell of TDD configuration 1 coexists with neighboring cell of TDD configuration 2, subframes 2/7 are non-UL/DL coexistence subframes and are thus designated anchor subframes. Subframes 3/8 are UL/DL coexistence subframes and thus designated non-anchor subframes.

In the case 1304 where a serving cell of TDD configuration 6 coexists with neighboring cell of TDD configuration 3, subframes 2/3/4 are non-UL/DL coexistence subframes and are thus designated anchor subframes. Subframes 7/8 are UL/DL coexistence subframes and are thus designated non-anchor subframes.

In the case 1306 where a serving cell of TDD configuration 3 coexists with a neighboring cell of TDD configuration 4, subframes 2/3 are non-UL/DL coexistence subframes and are thus designated anchor subframes. Subframe 4 is a UL/DL coexistence subframe and is thus designated a non-anchor subframe.

In the case 1308 where a serving cell of TDD configuration 1 coexists with a neighboring cell of TDD configuration 5, subframes 2 is a non-UL/DL coexistence subframe and is thus designated an anchor subframe. Subframes 3/7/8 are UL/DL coexistence subframes and are thus designated non-anchor subframes.

Once anchor subframes and non-anchor subframes are defined, different power control loops are determined for the anchor subframes and the non-anchor subframes respectively. Anchor subframes follow the TPC command that is generated based on the decoding status of the anchor subframe, while non-anchor subframes follow the TPC command that is generated based on the decoding status of the non-anchor subframe. In order to provide a separate TPC command for anchor subframes and non-anchor subframes, a new timeline is established for TDD configuration 0 as shown in the table 1400 illustrated in FIG. 14. For both accumulative and absolute power control, the eNB can map the TPC command from two loops of anchor and non-anchor subframe set to corresponding DL subframe whose effective subframe is in the same subframe set as shown in the table 1400 illustrated in FIG. 14.

For accumulative power control, since two close loops are maintained, the setting of UE PUSCH power in the anchor subframe set and non-anchor subframe are accumulated independently as follows:

$$P_{PUSCH}(i) = \min\left\{P_{max},\right.$$

$$\left. 10\log(M) + P_0 + \alpha \cdot PL + \sum_{m=0}^{i}\{\Delta_{PUSCH}(m - K_{PUSCH})\} + \Delta_{mcs}\right\}[\text{dBm}]$$

where m is limited to subframes which belong to the same subframe set of i (anchor or non-anchor subframe).

Figure 15:
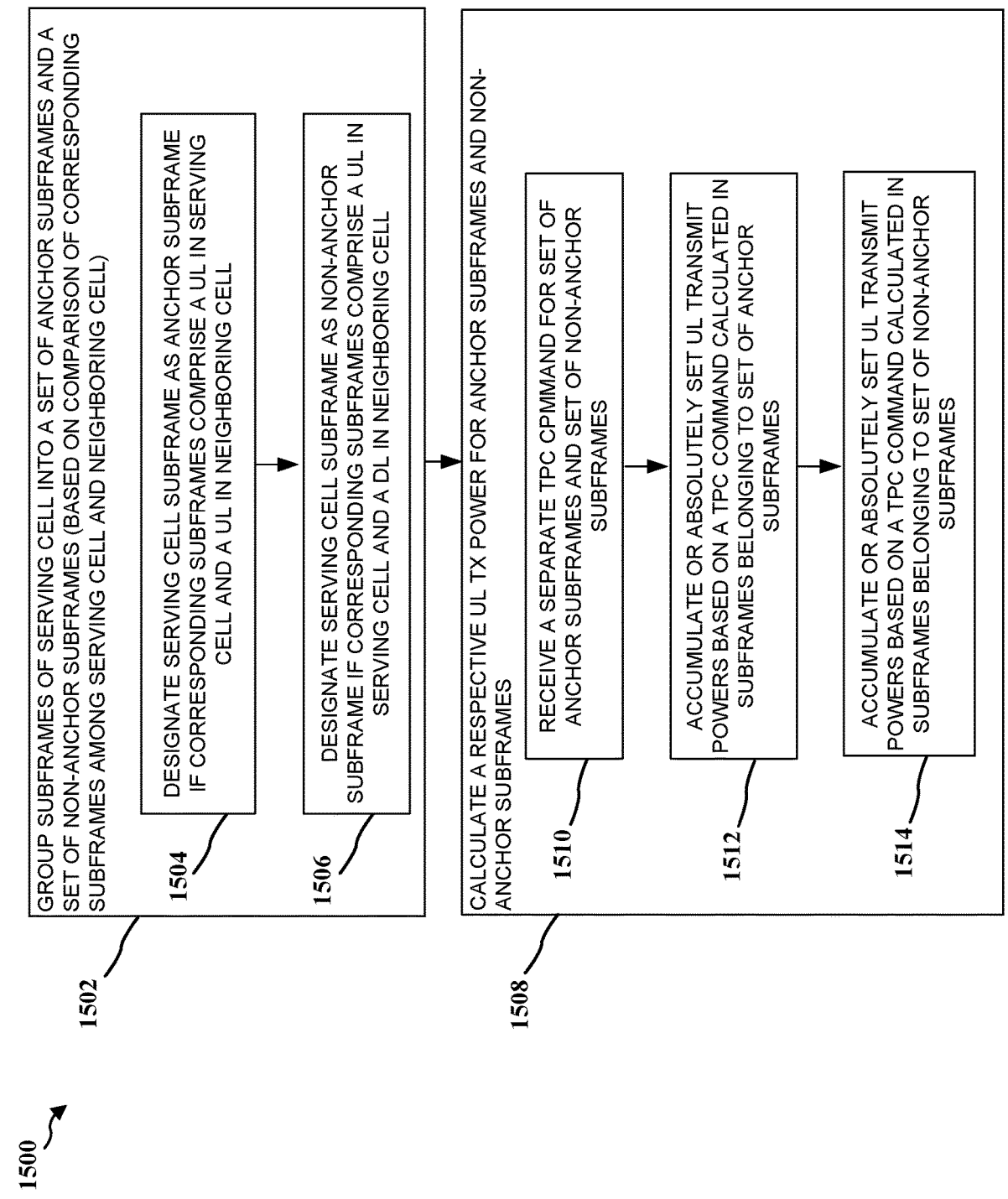
FIG. 15 is a flow chart of a method of UL closed loop power control for wireless communication performed by a UE.

FIG. 15 is a flow chart 1500 of a method of UL closed loop power control for wireless communication. The method may be performed by a UE. At step 1502, subframes of a TDD configuration of a serving cell are grouped into a set of anchor subframes and a set of non-anchor subframes. Such grouping may be based on a comparison of corresponding subframes of the serving cell and a neighboring cell.

For example, at step 1504, one or more UL subframe of the serving cell are designated anchor frames when corresponding subframes of the serving cell and the neighboring cell comprise an UL subframe in the serving cell and an UL subframe in the neighboring cell. This type of designation corresponds to, for example, subframes 2/7 in case 1302 of FIG. 13.

In another example, at step 1506 one or more UL subframe of the serving cell are designated non-anchor subframes when corresponding subframes of the serving cell and the neighboring cell comprise an UL subframe in the serving cell and a DL subframe in the neighboring cell. This type of designation corresponds to, for example, subframes 3/8 in case 1302 of FIG. 13.

At step 1508, a respective UL transmit power is calculated for the set of anchor subframes and for the set of non-anchor subframes. To this end, at step 1510, a separate TPC command is received for the set of anchor subframes and the set of non-anchor subframes. Then, at step 1512, the UL transmit power for anchor subframes is calculated by accumulating or absolutely setting UL transmit powers based on the TPC command calculated in subframes belonging to the set of anchor subframes. Finally, at step 1514, the UL transmit power for non-anchor subframes is calculated by accumulating or absolutely setting UL transmit powers based on the TPC command calculated in subframes belonging to the set of non-anchor subframes.

Open Loop Power Control Apparatus

Figure 16:
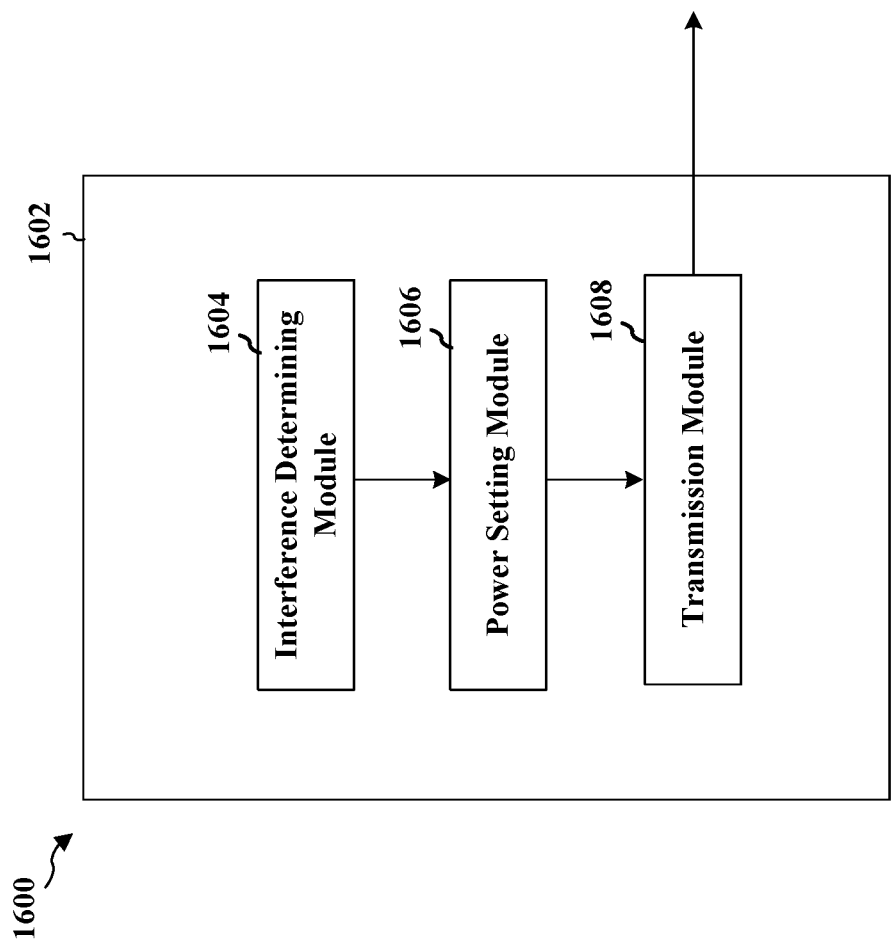
FIG. 16 is a conceptual data flow diagram illustrating the data flow between different modules/means/components in an exemplary apparatus that implements the open loop power control method of the flow chart in FIG. 10.

FIG. 16 is a conceptual data flow diagram 1600 illustrating the data flow between different modules/means/components in an exemplary apparatus 1602 for open loop power control. The apparatus may be a UE or and eNB. The apparatus includes an interference determining module 1604 that determines an interference type between a time division duplex (TDD) configuration subframe of a serving cell and a corresponding TDD configuration subframe of a neighboring cell, a power setting module 1606 that sets a transmit power for an apparatus in the serving cell based on the interference type, and a transmission module 1608 that transmits information based on the transmit power.

The apparatus may include additional modules that perform each of the steps of the algorithm in the aforementioned flow chart of FIG. 10. As such, each step in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 17:
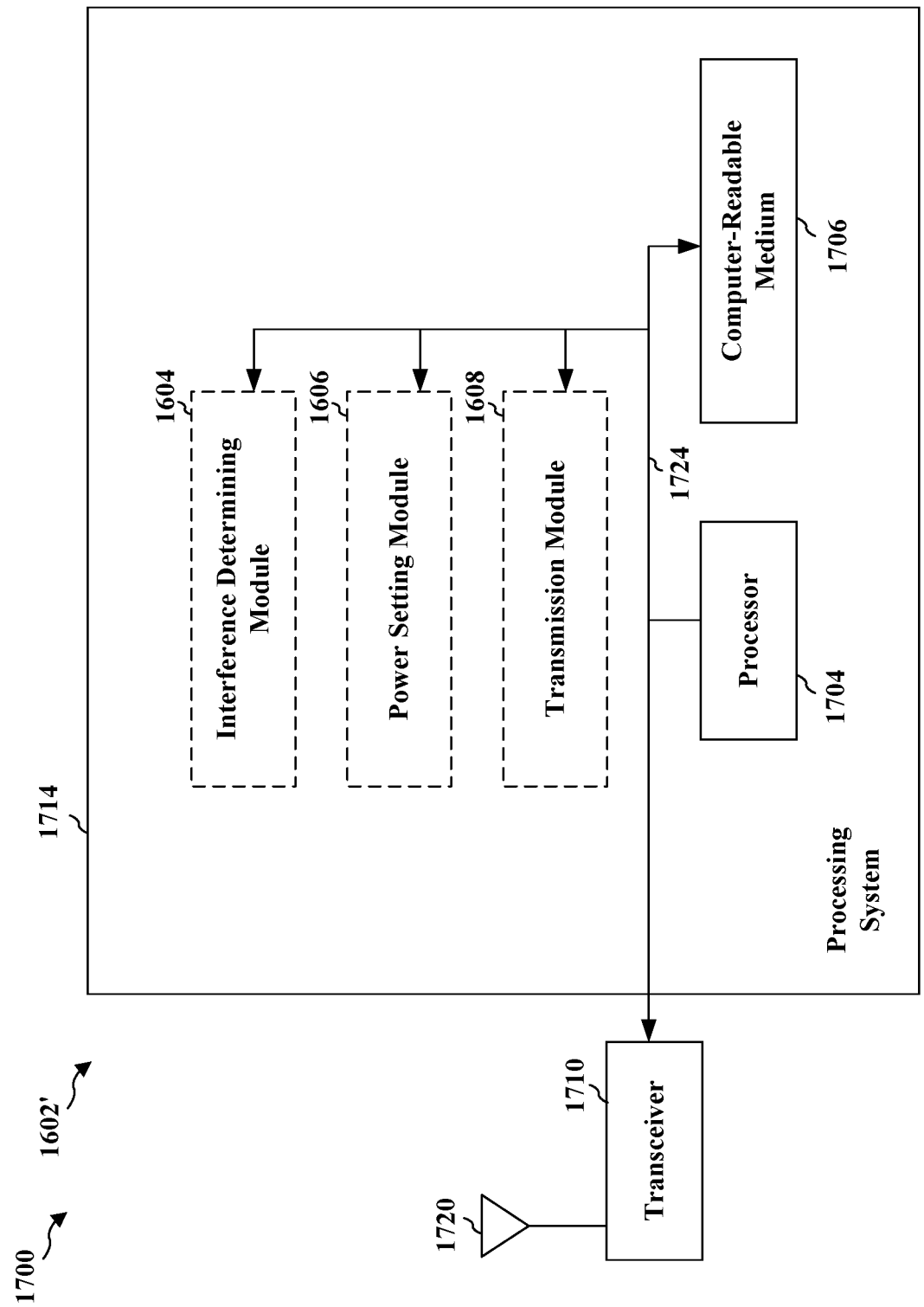
FIG. 17 is a diagram illustrating an example of a hardware implementation for an apparatus employing a processing system that implements the open loop power control method of the flow chart in FIG. 10.

FIG. 17 is a diagram 1700 illustrating an example of a hardware implementation for an apparatus 1602' employing a processing system 1714 for open loop power control. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1604, 1606, 1608, and the computer-readable medium 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The processing system 1714 includes a processor 1704 coupled to a computer-readable medium 1706. The processor 1704 is responsible for general processing, including the execution of software stored on the computer-readable medium 1706. The software, when executed by the processor 1704, causes the processing system 1714 to perform the various functions described supra for any particular apparatus. The computer-readable medium 1706 may also be used for storing data that is manipulated by the processor 1704 when executing software. The processing system further includes at least one of the modules 1604, 1606 and 1608. The modules may be software modules running in the processor 1704, resident/stored in the computer readable medium 1706, one or more hardware modules coupled to the processor 1704, or some combination thereof. The processing system 1714 may be a component of the eNB 610 and may include the memory 676 and/or at least one of the TX processor 616, the RX processor 670, and the controller/processor 675. The processing system 1714 may be a component of the UE 650 and may include the memory 660 and/or at least one of the TX processor 668, the RX processor 656, and the controller/processor 659.

In one configuration, the apparatus 1602/1602' for wireless communication includes means for determining an interference type between a TDD configuration subframe of a serving cell and a corresponding TDD configuration subframe of a neighboring cell, and means for setting a transmit power for an apparatus in the serving cell based on the interference type. The aforementioned means may be one or more of the aforementioned modules of the apparatus 1602 and/or the processing system 1714 of the apparatus 1602' configured to perform the functions recited by the aforementioned means. In case the apparatus is an eNB, as described supra, the processing system 1714 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means. In case the apparatus is a UE, as described supra, the processing system 1714 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

UL Open Loop Power Control Apparatus

Figure 18:
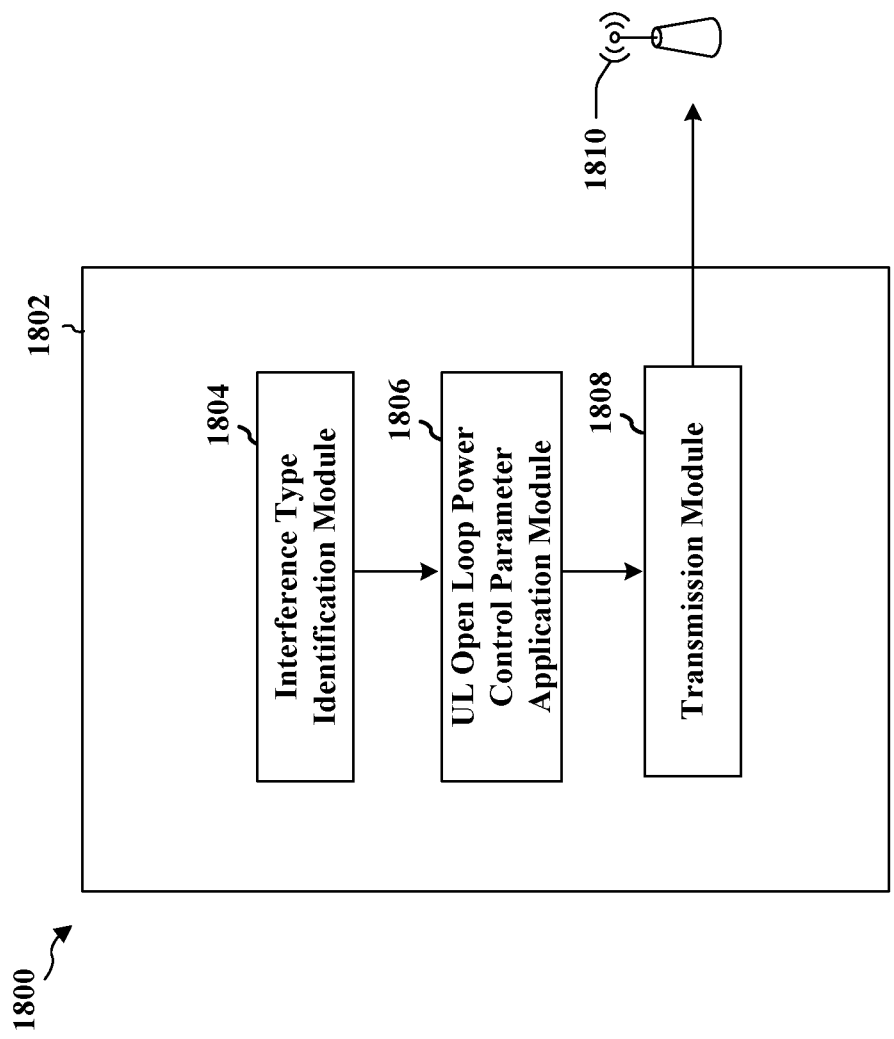
FIG. 18 is a conceptual data flow diagram illustrating the data flow between different modules/means/components in an exemplary apparatus that implements the UL open loop power control method of the flow chart in FIG. 11.

FIG. 18 is a conceptual data flow diagram 1800 illustrating the data flow between different modules/means/components in an exemplary apparatus 1802 for UL open loop power control. The apparatus may be a UE. The apparatus 1802 includes an interference type identification module 1804 that identifies a UL-UL interference type when corresponding subframes of a serving cell and a neighboring cell are UL subframes, and identifies a UL-DL interference type when corresponding subframes of a serving cell and a neighboring cell include an UL subframe in the serving cell and a DL subframe in the neighboring cell. The apparatus 1802 also includes a UL open loop power control parameter module 1806 that applies a set of UL open loop power control parameters, including a UE specific component $P_O$ and a cell specific parameter $\alpha$. The parameters are applied based on interference type. For example, in one arrangement, the parameter module 1806 applies a first $P_O$ for the subframe with UL-UL interference type and a second $P_O$ for the subframe with UL-DL interference type. In another arrangement, the parameter module 1806 applies a first $\alpha$ for the subframe with UL-UL interference type and a second $\alpha$ for the subframe with UL-DL interference type. In yet another arrangement, the parameter module 1806 applies a first $P_O$ for the subframe with UL-UL interference type and a second $P_O$ for the subframe with UL-DL interference type and applies a first $\alpha$ for the subframe with UL-UL interference type and a second $\alpha$ for the subframe with UL-DL interference type. The apparatus 1802 further includes a transmission module 1808 that transmits information based on the set of UL open loop power control parameters, e.g., to eNB 1810.

The apparatus 1802 may include additional modules that perform each of the steps of the algorithm in the aforementioned flow charts of FIG. 11. As such, each step in the aforementioned flow charts of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 19:
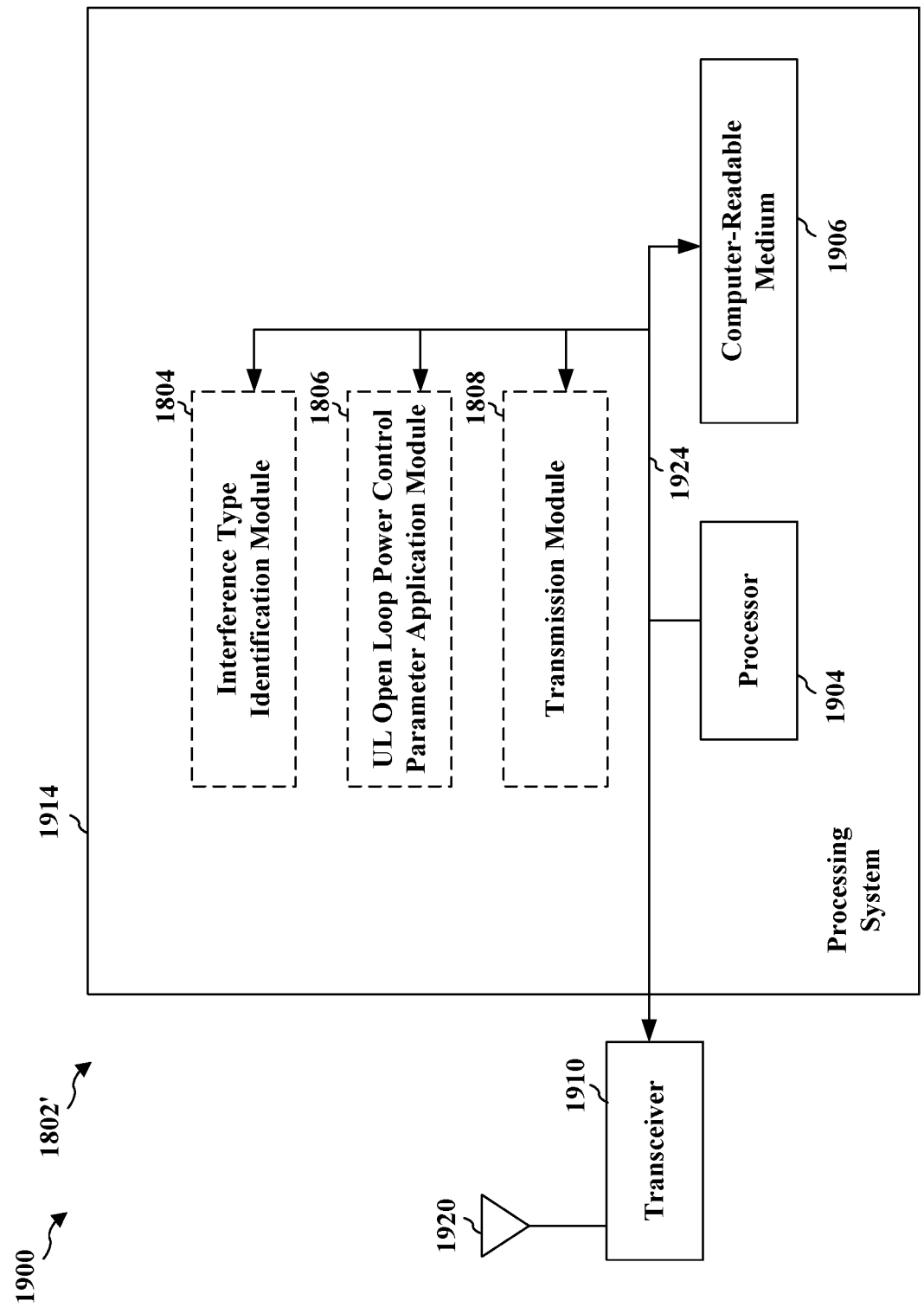
FIG. 19 is a diagram illustrating an example of a hardware implementation for an apparatus employing a processing system that implements the UL open loop power control method of the flow chart in FIG. 11.

FIG. 19 is a diagram 1900 illustrating an example of a hardware implementation for an apparatus 1802' employing a processing system 1914 for UL open loop power control. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware modules, represented by the processor 1904, the modules 1804, 1806, 1808, and the computer-readable medium 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The processing system 1914 includes a processor 1904 coupled to a computer-readable medium 1906. The processor 1904 is responsible for general processing, including the execution of software stored on the computer-readable medium 1906. The software, when executed by the processor 1904, causes the processing system 1914 to perform the various functions described supra for any particular apparatus. The computer-readable medium 1906 may also be used for storing data that is manipulated by the processor 1904 when executing software. The processing system further includes at least one of the modules 1804, 1806, and 1808. The modules may be software modules running in the processor 1904, resident/stored in the computer readable medium 1906, one or more hardware modules coupled to the processor 1904, or some combination thereof. The processing system 1914 may be a component of the UE 650 and may include the memory 660 and/or at least one of the TX processor 668, the RX processor 656, and the controller/processor 659.

In one configuration, the apparatus 1802/1802' for wireless communication includes means for determining an interference type that is configured to identify a UL-UL interference type when corresponding subframes of the serving cell and the neighboring cell are UL subframes, and identify a UL-DL interference type when corresponding subframes of the serving cell and the neighboring cell comprise an UL subframe in the serving cell and a DL subframe in the neighboring cell. The apparatus 1802/1802' also includes means for applying a set of UL open loop power control parameters, including a UE specific component $P_O$ and a cell specific parameter $\alpha$. The means for applying a set of UL open loop control parameters may be configured to apply a first $P_O$ for the subframe with UL-UL interference type and a second $P_O$ for the subframe with UL-DL interference type. The means for applying a set of UL open loop power control parameters may also be configured to apply a first $\alpha$ for the subframe with UL-UL interference type and a second $\alpha$ for the subframe with UL-DL interference type. The means for applying a set of UL open loop power control parameters may also be configured to apply a first $P_O$ for the subframe with UL-UL interference type and a second $P_O$ for the subframe with UL-DL interference type, and apply a first $\alpha$ for the subframe with UL-UL interference type and a second $\alpha$ for the subframe with UL-DL interference type.

The aforementioned means may be one or more of the aforementioned modules of the apparatus 1802 and/or the processing system 1914 of the apparatus 1802' configured to perform the functions recited by the aforementioned means. As described supra, the processing system 1914 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

DL Power Control Apparatus

Figure 20:
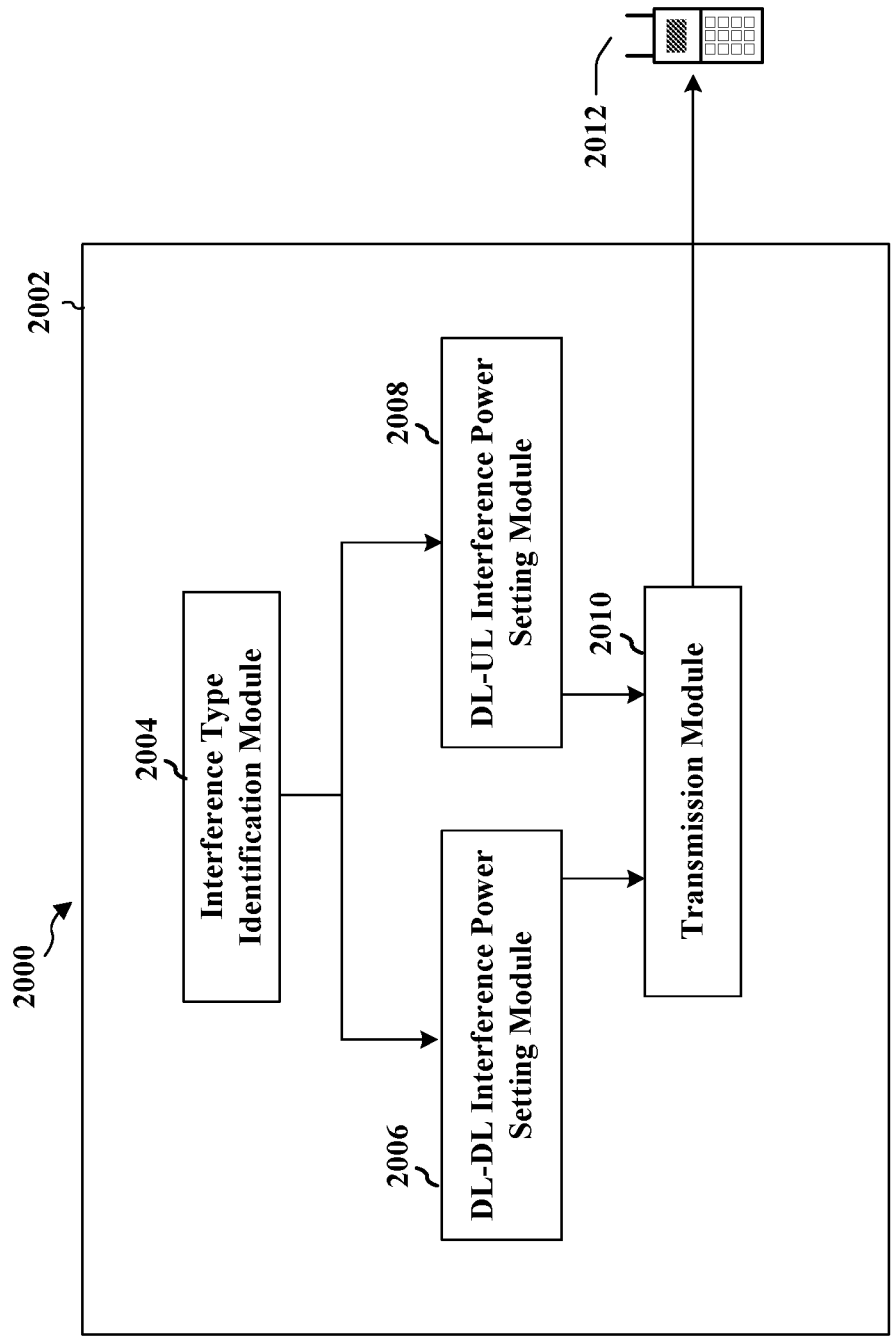
FIG. 20 is a conceptual data flow diagram illustrating the data flow between different modules/means/components in an exemplary apparatus that implements the DL power control method of the flow chart in FIG. 12.

FIG. 20 is a conceptual data flow diagram 2000 illustrating the data flow between different modules/means/components in an exemplary apparatus 2002 for DL power control. The apparatus may be a eNB. The apparatus includes an interference type identification module 2004 that identifies a DL-DL interference type when corresponding subframes of a serving cell and a neighboring cell are both DL subframes or both special subframes, and identifies DL-UL interference type when corresponding subframes of the serving cell and the neighboring cell include a DL subframe in the serving cell and an UL subframe in the neighboring cell. The apparatus 2002 also includes a DL-DL interference power setting module 2006 that sets a DL transmit power at a fixed, full power DL transmission in cases of DL-DL interference, and a DL-UL interference power setting module that adjusts a DL transmit power according to UL open loop power control parameters ($P_O$, α) of the neighboring cell in cases of DL-UL interference. The apparatus 2002 also includes a transmission module 2010 that transmits information, e.g., to UE 2012, based on the set or adjusted DL transmit power.

The apparatus 2002 may include additional modules that perform each of the steps of the algorithm in the aforementioned flow charts of FIG. 12. As such, each step in the aforementioned flow charts of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 21:
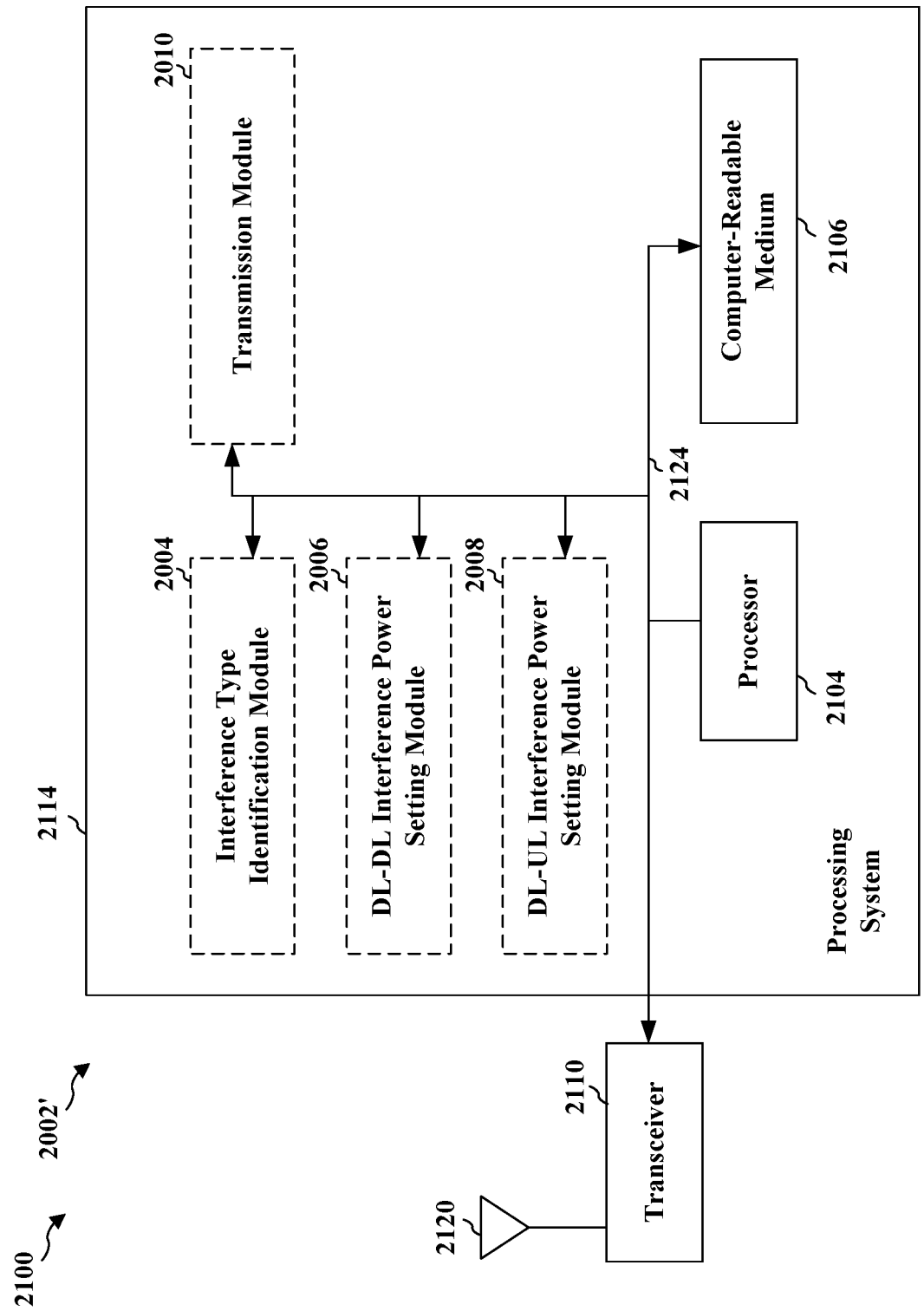
FIG. 21 is a diagram illustrating an example of a hardware implementation for an apparatus employing a processing system that implements DL power control method of the flow chart in FIG. 12.

FIG. 21 is a diagram 2100 illustrating an example of a hardware implementation for an apparatus 2002' employing a processing system 2114 for DL power control. The processing system 2114 may be implemented with a bus architecture, represented generally by the bus 2124. The bus 2124 may include any number of interconnecting buses and bridges depending on the specific application of the processing system 2114 and the overall design constraints. The bus 2124 links together various circuits including one or more processors and/or hardware modules, represented by the processor 2104, the modules 2004, 2006, 2008, 2010 and the computer-readable medium 2106. The bus 2124 may also link various other circuits such as timing sources, peripherals, voltage regulators, and power management circuits, which are well known in the art, and therefore, will not be described any further.

The processing system 2114 may be coupled to a transceiver 2110. The transceiver 2110 is coupled to one or more antennas 2120. The transceiver 2110 provides a means for communicating with various other apparatus over a transmission medium. The processing system 2114 includes a processor 2104 coupled to a computer-readable medium 2106. The processor 2104 is responsible for general processing, including the execution of software stored on the computer-readable medium 2106. The software, when executed by the processor 2104, causes the processing system 2114 to perform the various functions described supra for any particular apparatus. The computer-readable medium 2106 may also be used for storing data that is manipulated by the processor 2104 when executing software. The processing system further includes at least one of the modules 2004, 2006, 2008 and 2010. The modules may be software modules running in the processor 2104, resident/stored in the computer readable medium 2106, one or more hardware modules coupled to the processor 2104, or some combination thereof. The processing system 2114 may be a component of the eNB 610 and may include the memory 676 and/or at least one of the TX processor 616, the RX processor 670, and the controller/processor 675.

In one configuration, the apparatus 2002/2002' for wireless communication includes means for determining an interference type that is configured to identify a DL-DL interference type when corresponding subframes of the serving cell and the neighboring cell are both DL subframes or both special subframes, and identify a DL-UL interference type when corresponding subframes of the serving cell and the neighboring cell comprise a DL subframe in the serving cell and an UL subframe in the neighboring cell. The apparatus 2002/2002' also includes means for setting a DL transmit power that is configured to set the DL transmit power at a fixed, full power DL transmission in cases of DL-DL interference, and means for setting a DL transmit power that is configured to adjust the DL transmit power according to UL open loop power control parameters of the neighboring cell in cases of DL-UL interference.

The aforementioned means may be one or more of the aforementioned modules of the apparatus 2002 and/or the processing system 2114 of the apparatus 2002' configured to perform the functions recited by the aforementioned means. As described supra, the processing system 2114 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

UL Closed Loop Power Control Apparatus

Figure 22:
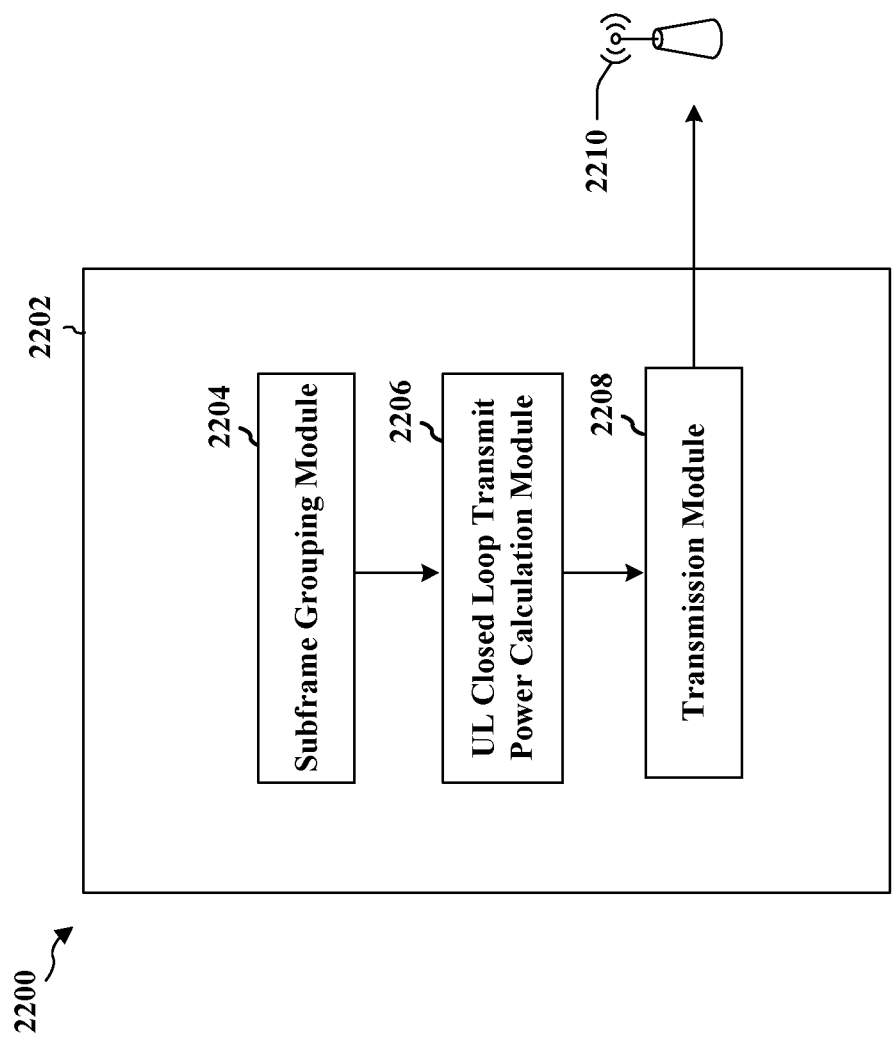
FIG. 22 is a conceptual data flow diagram illustrating the data flow between different modules/means/components in an exemplary apparatus that implements the UL closed loop power control method of the flow chart in FIG. 15.

FIG. 22 is a conceptual data flow diagram 2200 illustrating the data flow between different modules/means/components in an exemplary apparatus 2202 for UL closed loop power control. The apparatus may be a UE. The apparatus includes a subframe grouping module 2204 that groups subframes of a TDD configuration of a serving cell into a set of anchor subframes and a set of non-anchor subframes, and a UL closed loop transmit power calculation module 2206 that calculates a respective UL transmit power for the set of anchor subframes and for the set of non-anchor subframes. The calculation module also receives a separate TPC command for the set of anchor subframes and the set of non-anchor subframes. The apparatus 2002 also includes a transmission module 2208 that transmits information based on the calculated UL transmit power, e.g., to eNB 2210.

The apparatus may include additional modules that perform each of the steps of the algorithm in the aforementioned flow charts of FIG. 15. As such, each step in the aforementioned flow charts of FIG. 15 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 23:
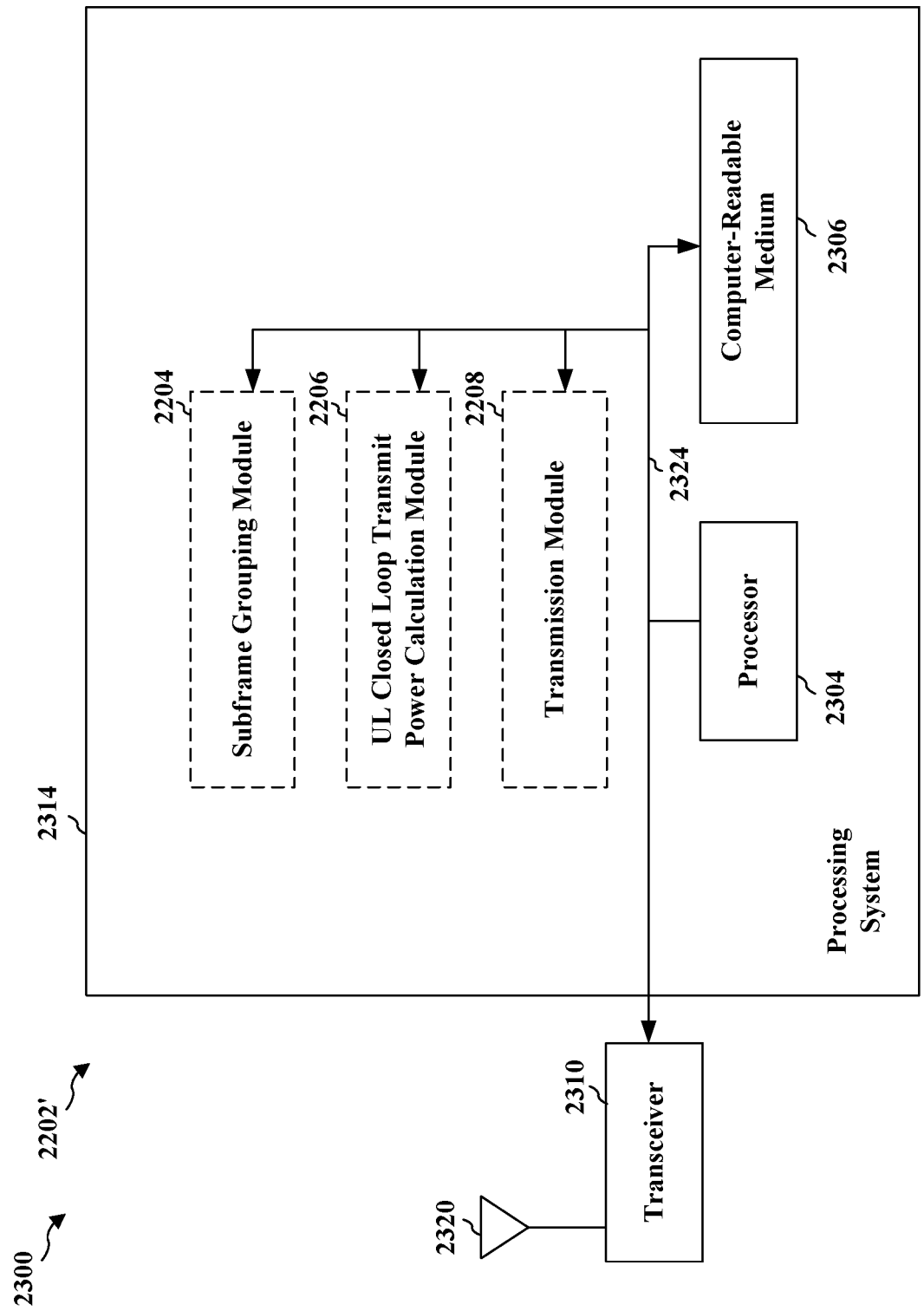
FIG. 23 is a diagram illustrating an example of a hardware implementation for an apparatus employing a processing system that implements the UL closed loop power control method of the flow chart in FIG. 15.

FIG. 23 is a diagram 2300 illustrating an example of a hardware implementation for an apparatus 2202' employing a processing system 2314 for UL closed loop power control. The processing system 2314 may be implemented with a bus architecture, represented generally by the bus 2324. The bus 2324 may include any number of interconnecting buses and bridges depending on the specific application of the processing system 2314 and the overall design constraints. The bus 2324 links together various circuits including one or more processors and/or hardware modules, represented by the processor 2304, the modules 2204, 2206, 2208, and the computer-readable medium 2306. The bus 2324 may also link various other circuits such as timing sources, peripherals, voltage regulators, and power management circuits, which are well known in the art, and therefore, will not be described any further.

The processing system 2314 may be coupled to a transceiver 2310. The transceiver 2310 is coupled to one or more antennas 2320. The transceiver 2310 provides a means for communicating with various other apparatus over a transmission medium. The processing system 2314 includes a processor 2304 coupled to a computer-readable medium 2306. The processor 2304 is responsible for general processing, including the execution of software stored on the computer-readable medium 2306. The software, when executed by the processor 2304, causes the processing system 2314 to perform the various functions described supra for any particular apparatus. The computer-readable medium 2306 may also be used for storing data that is manipulated by the processor 2304 when executing software. The processing system further includes at least one of the modules 2204, 2206, and 2208. The modules may be software modules running in the processor 2304, resident/stored in the computer readable medium 2306, one or more hardware modules coupled to the processor 2304, or some combination thereof. The processing system 2314 may be a component of the UE 650 and may include the memory 660 and/or at least one of the TX processor 668, the RX processor 656, and the controller/processor 659.

In one configuration, the apparatus 2202/2202' for wireless communication includes means for grouping subframes of a TDD configuration of a serving cell into a set of anchor subframes and a set of non-anchor subframes, and means for calculating a respective UL transmit power for the set of anchor subframes and for the set of non-anchor subframes. The means for calculating an UL transmit power includes means for receiving a separate TPC command for the set of anchor subframes and the set of non-anchor subframes.

The aforementioned means may be one or more of the aforementioned modules of the apparatus 2202 and/or the processing system 2314 of the apparatus 2202' configured to perform the functions recited by the aforementioned means. As described supra, the processing system 2314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Downlink Open Loop Power Control Using eNB-eNB Signaling:

To capture victim eNB uplink interference and loading status into consideration, DL open loop power setting at the effective point of new TDD configuration is required which includes: power setting for new cluster node when configuration changes from victim to aggressor, and power setting for neighbor cluster node when configuration changes from aggressor to victim.

Figure 24:
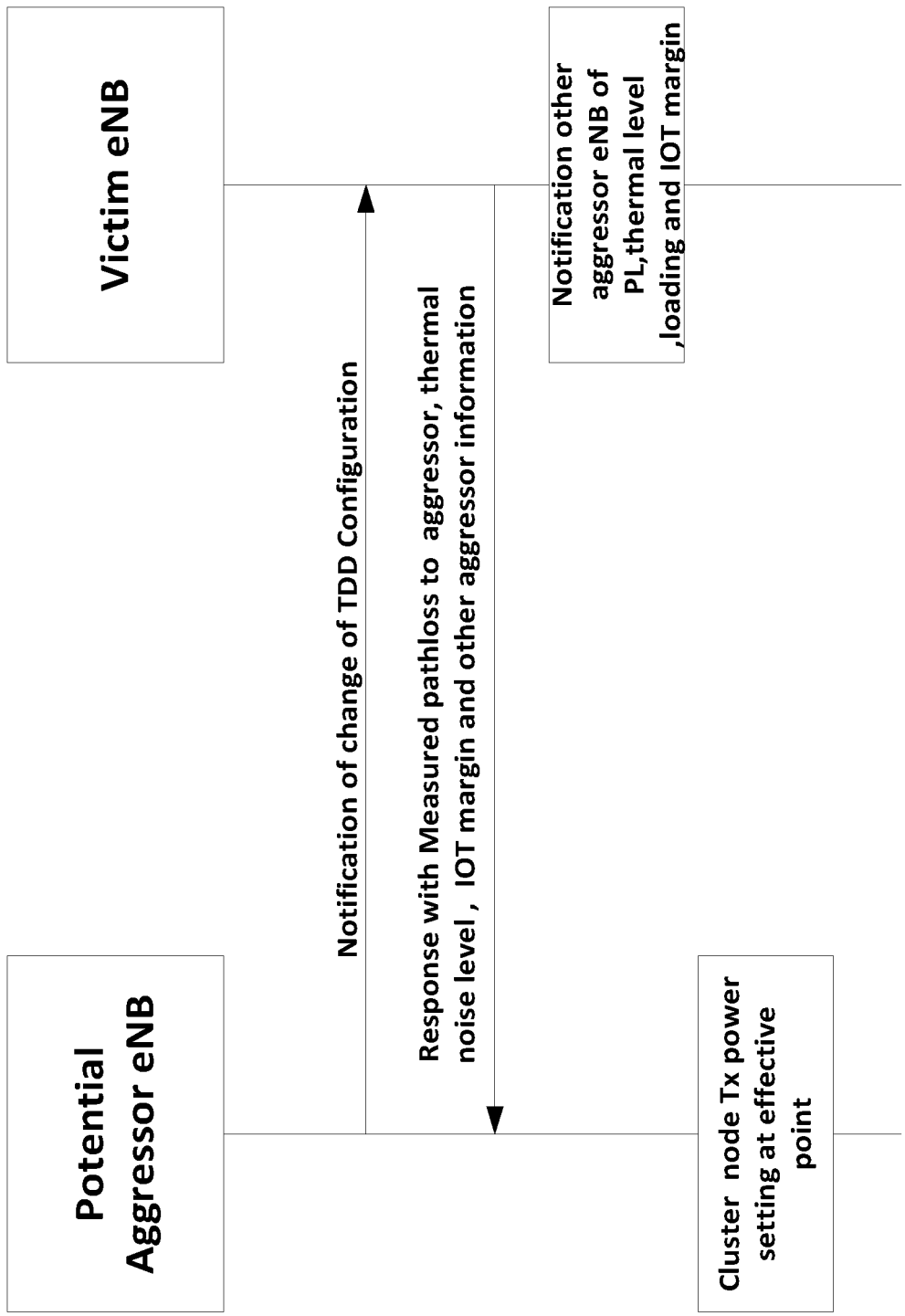
FIG. 24 is a diagram illustrating open loop power control when cluster configuration changes from victim to aggressor.

FIG. 24 illustrates open loop power control when cluster configuration changes from victim to aggressor. Upon decision of application of one new configuration, potential aggressor eNB notifies its configuration information to its neighbor eNB. The neighbor victim eNB responds with its measurement of pathloss, its thermal noise level, interference over thermal noise (IOT) margin (up to its uplink loading and normal UL interference) and other aggressor information if any. The neighbor eNB notifies other aggressor eNB node of the addition of new aggressor. The potential aggressor eNB tries to set its initial DL Tx power independently or together with other aggressor nodes.

Figure 25:
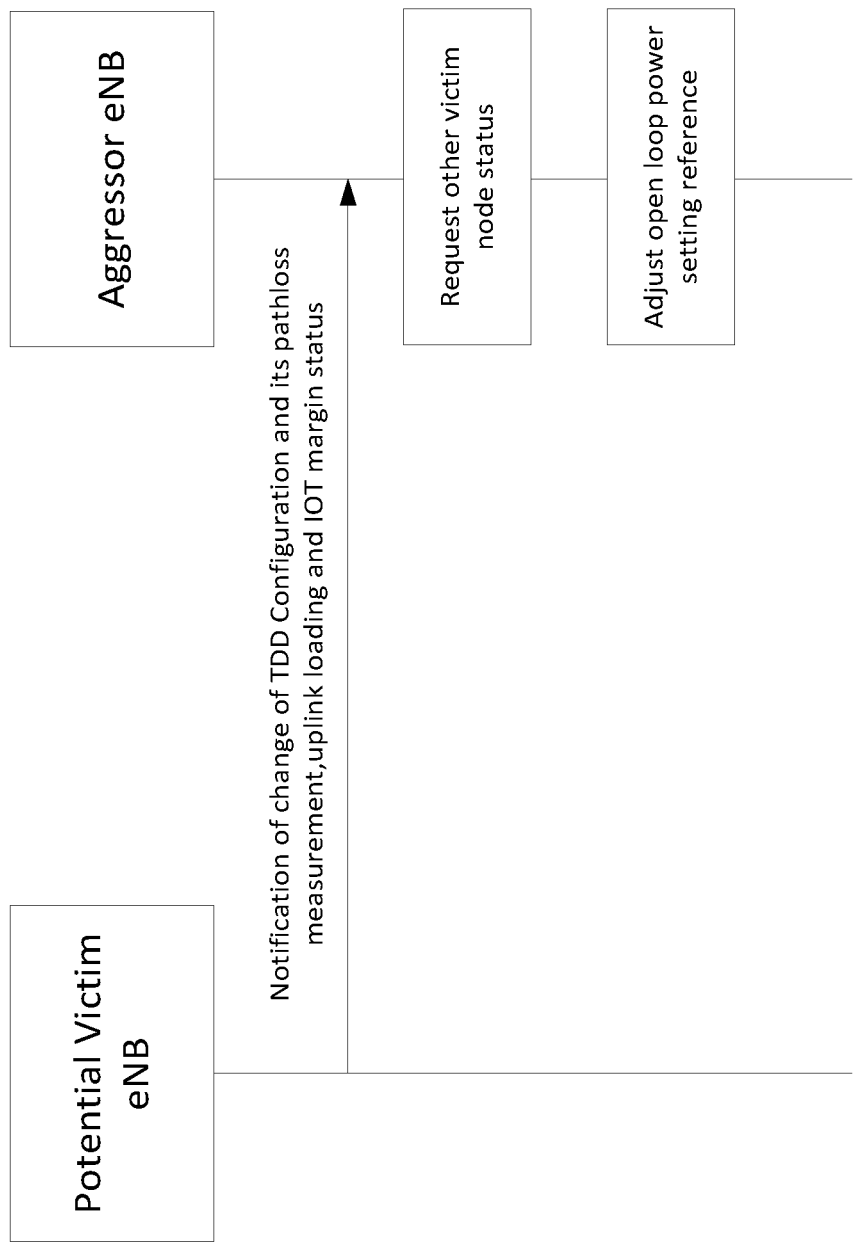
FIG. 25 is a diagram illustrating open loop power control when cluster configuration changes from aggressor to victim.

FIG. 25 illustrates open loop power control when cluster configuration changes from aggressor to victim. Upon decision of application of one new configuration, potential victim eNB notifies its configuration information, thermal noise level, IOT margin and pathloss measurement to its neighbor eNB. The neighbor aggressor eNB requests other victim's UL status and neighbor victim eNB notifies other aggressor eNB of its current updated status if any. The impacted aggressor eNB updates its initial Tx power based on up to dated victim eNB status.

Open Loop Tx Power Setup:

For aggressor set C with node $Cp1, \ldots Cpn$, define victim cell set X with node $Xp1, \ldots Xpm$ whose isolation to node of aggressor set C is under certain threshold and has uplink transmission, the optimal open loop Tx power setting of C is the solution of following linear optimization problem:

$\text{Max}(TxPwrCp1+ \ldots TxPwrCpn)$ subjected to

1) $\text{MinCRSPwr} < \text{TxPwrCpj} < \text{MaxTxPwr}$
2) $\text{IoTXpi} < \text{IOTthreshold} - \text{IOTMargin i}$ It is noted that the optimization can be done per cluster/multiple cluster basis, IOT margin for victim eNB can be set aggressively for single cluster optimization case. As for the isolation threshold selection, it is recommended to compensate the Tx power difference between enodeB and UE average uplink Tx power (for example, 70 db+nodeb max Tx power−UE average UL Tx power) so that aggressor eNB looks like one UE for smooth interference control.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
grouping subframes of a time division duplex (TDD) configuration of a serving cell, that comprises a first base station and serves a first UE, into a set of anchor subframes and a set of non-anchor subframes based on an interference between the TDD configuration of the serving cell and a corresponding TDD configuration of a neighboring cell that comprises a second base station and serves a second UE, wherein grouping the subframes comprises:
designating one or more subframes of the serving cell as the set of anchor subframes when corresponding subframes of the serving cell and the neighboring cell comprise a first UL subframe in the serving cell and a corresponding UL subframe in the neighboring cell; and designating the one or more subframes of the serving cell as the set of non-anchor subframes when the corresponding subframes of the serving cell and the neighboring cell comprise a second UL subframe in the serving cell and a DL subframe in the neighboring cell;
receiving a first TPC command for the set of anchor subframes,
wherein the first TPC command for the set of anchor subframes is generated based on whether an anchor subframe has been decoded;
receiving a second TPC command for the set of non-anchor subframes, wherein the second TPC command for the set of non-anchor subframes is generated based on whether a non-anchor subframe has been decoded;
calculating a first UL transmit power for the set of anchor subframes by accumulating a change to the first UL transmit power associated with the first TPC command over the set of anchor subframes; and
calculating a second UL transmit power for the set of non-anchor subframes by accumulating a change in the second UL transmit power associated with the second TPC command over the set of non-anchor subframes.

2. An apparatus of wireless communication, comprising:
means for grouping subframes of a time division duplex (TDD) configuration of a serving cell, that comprises a first base station and serves a first UE, into a set of anchor subframes and a set of non-anchor subframes based on an interference between the TDD configuration of the serving cell and a corresponding TDD configuration of a neighboring cell that comprises a second base station and serves a second UE, wherein to group the subframes, the means for grouping is configured to:
designate one or more subframes of the serving cell as the set of anchor subframes when corresponding subframes of the serving cell and the neighboring cell comprise a first UL subframe in the serving cell and a corresponding UL subframe in the neighboring cell; and
designate the one or more subframes of the serving cell as the set of non-anchor subframes when the corresponding subframes of the serving cell and the neighboring cell comprise a second UL subframe in the serving cell and a DL subframe in the neighboring cell;
means for receiving a first TPC command for the set of anchor subframes, wherein the first TPC command for the set of anchor subframes is generated based on whether an anchor subframe has been decoded;
means for receiving a second TPC command for the set of non-anchor subframes, wherein the second TPC command for the set of non-anchor subframes is generated based on whether a non-anchor subframe has been decoded;
means for calculating a first UL transmit power for the set of anchor subframes by accumulating a change to the first UL transmit power associated with the first TPC command over the set of anchor subframes; and
means for calculating a second UL transmit power for the set of non-anchor subframes by accumulating a change in the second UL transmit power associated with the second TPC command over the set of non-anchor subframes.

3. An apparatus for wireless communication, comprising a processing system configured to:
group subframes of a time division duplex (TDD) configuration of a serving cell, that comprises a first base station and serves a first UE, into a set of anchor subframes and a set of non-anchor subframes based on an interference between the TDD configuration of the serving cell and a corresponding TDD configuration of a neighboring cell that comprises a second base station and serves a second UE, wherein to group the subframes, the processing system is configured to:
designate one or more subframes of the serving cell as the set of anchor subframes when corresponding subframes of the serving cell and the neighboring cell comprise a first UL subframe in the serving cell and a corresponding UL subframe in the neighboring cell; and
designate the one or more subframes of the serving cell as the set of non-anchor subframes when the corresponding subframes of the serving cell and the neighboring cell comprise a second UL subframe in the serving cell and a DL subframe in the neighboring cell;
receive a first TPC command for the set of anchor subframes, wherein the first TPC command for the set of anchor subframes is generated based on whether an anchor subframe has been decoded;
receive a second TPC command for the set of non-anchor subframes, wherein the second TPC command for the set of non-anchor subframes is generated based on whether a non-anchor subframe has been decoded;
calculate a first UL transmit power for the set of anchor subframes by accumulating a change to the first UL transmit power associated with the first TPC command over the set of anchor subframes; and
calculate a second UL transmit power for the set of non-anchor subframes by accumulating a change in the second UL transmit power associated with the second TPC command over the set of non-anchor subframes.

4. A non-transitory computer-readable medium comprising:
code for grouping subframes of a time division duplex (TDD) configuration of a serving cell, that comprises a first base station and serves a first UE, into a set of anchor subframes and a set of non-anchor subframes based on an interference between the TDD configuration of the serving cell and a corresponding TDD configuration of a neighboring cell that comprises a second base station and serves a second UE, wherein to group the subframes, the code for grouping is configured to:
designate one or more subframes of the serving cell as the set of anchor subframes when corresponding subframes of the serving cell and the neighboring cell comprise a first UL subframe in the serving cell and a corresponding UL subframe in the neighboring cell; and
designate the one or more subframes of the serving cell as the set of non-anchor subframes when the corresponding subframes of the serving cell and the neighboring cell comprise a second UL subframe in the serving cell and a DL subframe in the neighboring cell;
code for receiving a first TPC command for the set of anchor subframes, wherein the first TPC command for the set of anchor subframes is generated based on whether an anchor subframe has been decoded;
code for receiving a second TPC command for the set of non-anchor subframes, wherein the second TPC command for the set of non-anchor subframes is generated based on whether a non-anchor subframe has been decoded;
code for calculating a first UL transmit power for the set of anchor subframes by accumulating a change to the first UL transmit power associated with the first TPC command over the set of anchor subframes; and code for calculating a second UL transmit power for the set of non-anchor subframes by accumulating a change in the second UL transmit power associated with the second TPC command over the set of non-anchor subframes.

* * * * *